(12) United States Patent
Jeong et al.

(10) Patent No.: US 8,637,634 B2
(45) Date of Patent: Jan. 28, 2014

(54) BLOCK AND GRAFT COPOLYMERS OF POLY(ALKYLENE CARBONATE) AND VARIOUS POLYMERS

(75) Inventors: JiSu Jeong, Daejeon (KR); SungJae Na, Daejeon (KR); Sujith Sudevan, Daejeon (KR); MyungAhn Ok, Daejeon (KR); YongGyu Han, Daejeon (KR); KwangJin Chung, Daejeon (KR); Bun Yeoul Lee, Seoul (KR); Anish Cyriac, Suwon-si (KR); SangHwan Lee, Suwon-si (KR)

(73) Assignee: SK Innovation Co., Ltd., Seoul (KR)

( * ) Notice: Subject to any disclaimer, the term of this patent is extended or adjusted under 35 U.S.C. 154(b) by 345 days.

(21) Appl. No.: 13/036,714

(22) Filed: Feb. 28, 2011

(65) Prior Publication Data
US 2011/0251355 A1 Oct. 13, 2011

(30) Foreign Application Priority Data
Apr. 13, 2010 (KR) ........................ 10-2010-0033763

(51) Int. Cl.
C08G 64/34 (2006.01)
C08G 64/32 (2006.01)
C08G 64/18 (2006.01)
C08G 64/02 (2006.01)

(52) U.S. Cl.
USPC .......................................... 528/405

(58) Field of Classification Search
USPC .......................................... 525/418
See application file for complete search history.

(56) References Cited

U.S. PATENT DOCUMENTS
2010/0029896 A1 2/2010 Ok et al.

FOREIGN PATENT DOCUMENTS

| CN | 101020747 A | * | 8/2007 | ............ C08G 64/00 |
| KR | 100853358 B1 | | 8/2008 | |
| KR | 1020100013255 A | | 2/2010 | |
| KR | 100981270 B1 | | 9/2010 | |
| WO | 2008136591 A1 | | 11/2008 | |
| WO | WO 2010028362 A1 | * | 3/2010 | ............ C08G 64/02 |

OTHER PUBLICATIONS

Na et al ("Elucidation of the Structure of a Highly Active Catalytic Sysetm for CO2/Epoxide Copolymerization: A salen-Cobaltate Complex of an Unusual Binding Mode" Inorganic Chemistry, 2009, 48, 10455-10465, Sep. 25, 2009).*

Kim et al., "Cobalt(III) Complexes of Various Salen-Type Ligand Bearing Four Quarternary Ammonium Salts and Their Reactivity for CO2/Epoxide Copolymerization", Bull. Korean Chem. Soc., 2010, pp. 829-834, vol. 31, No. 4.

Min et al., "Efficient Synthesis of a Highly Active Catalyst for CO2/Epoxide Copolymerization", Bull. Korean Chem. Soc., 2009, pp. 745-748, vol. 30, No. 3.

Na et al., "Elucidation of the Structure of a Highly Active Catalytic System for CO2/Epoxide Copolymerization: A salen-Cobaltate Complex of an Unusual Binding Mode", Inorg. Chem., 2009, pp. 10455-10465, vol. 48.

Sujith et al., "A Highly Active and Recyclable Catalytic System for CO2/Propylene Oxide Copolymerization", Angew. Chem. Int. Ed., 2008, pp. 7306-7309, vol. 47.

Noh et al., "Two Components in a Molecule: Highly Efficient and Thermally Robust Catalytic System for CO2/Epoxide Copolymerization", J. Am. Chem. Soc., 2007, pp. 8082-8083, vol. 129.

\* cited by examiner

*Primary Examiner* — Randy Gulakowski
*Assistant Examiner* — Christopher M Rodd
(74) *Attorney, Agent, or Firm* — The Webb Law Firm

(57) ABSTRACT

Provided is preparation of poly(alkylene carbonate) by alternating copolymerization of carbon dioxide and epoxide. To be specific, provided are a method for preparing block or graft copolymers of the polymer compound and poly(alkylene carbonate) by alternating-copolymerization of an epoxide compound and carbon dioxide by using a metal (III) compound prepared from salen-type ligand with a quaternary ammonium salt as a catalyst in the presence of a polymer compound having a functional group of hydroxyl or carboxylic acid, and block or graft copolymers prepared by the method.

11 Claims, 1 Drawing Sheet

BLOCK AND GRAFT COPOLYMERS OF POLY(ALKYLENE CARBONATE) AND VARIOUS POLYMERS

TECHNICAL FIELD

The present invention relates to preparation of poly(alkylene carbonate) by alternating copolymerization of carbon dioxide and epoxide. To be specific, the present invention relates to a method for preparing block or graft copolymers of the polymer compound and poly(alkylene carbonate) by alternating copolymerization of an epoxide compound and carbon dioxide by using a metal (III) compound prepared from a salen-type ligand with quaternary ammonium salts as a catalyst in the presence of a polymer compound having a functional group of hydroxyl or carboxylic acid, and block or graft copolymers prepared by the method.

BACKGROUND ART

Poly (alkylene carbonate) is an easily biodegradable polymer and is useful for packaging or coating materials, etc. A process for preparing poly(alkylene carbonate) from an epoxide compound and carbon dioxide is highly eco-friendly because there is no involvement of harmful compounds like phosgene and adopt easily available and inexpensive carbon dioxide.

Since 1960's, many researchers have developed various types of catalysts to prepare poly(alkylene carbonate) from an epoxide compound and carbon dioxide. Recently, we have developed a highly active and highly selective catalyst synthesized from the salen [Salen: ([H$_2$Salen=N,N'-bis(3,5-dialkylsalicylideng)-1,2-ethylenediamine]type ligand with quaternary ammonium salts [Bun Yeoul Lee, KR Patent No. 10-0853358 (Registration date: 2008, Aug. 13); Bun Yeoul Lee, Sujith S, Eun Kyung Noh, Jae Ki Min, KR Patent Application No. 10-2008-0015454 (Application date: 2008, Feb. 20); Bun Yeoul Lee, Sujith S, Eun Kyung Noh, Jae Ki Min, PCT/KR2008/002453 (Application date: 2008 Apr. 30); Eun Kyung Noh, Sung Jae Na, Sujith S, Sang-Wook Kim, and Bun Yeoul Lee* *J. Am. Chem. Soc.* 2007, 129, 8082-8083 (2007, Jul. 4); Sujith S, Jae Ki Min, Jong Eon Seong, Sung Jae Na, and Bun Yeoul Lee, *Angew. Chem. Int. Ed.,* 2008, 47, 7306-7309 (2008, Sep. 8)]. The catalyst developed by the present inventors shows high activity and high selectivity, and provides copolymers with a high molecular weight. Moreover, since the catalyst realizes polymerization activity even at high temperature, it is easily applicable to commercial processes. In addition, since the catalyst includes quaternary ammonium salts in the ligand, there is an advantage that it is possible to easily separate catalyst from copolymers after copolymerization of carbon dioxide/epoxide.

The present inventors closely analyzed the catalyst specially showing high activity and high selectivity compared to the others in the catalyst group of the above-mentioned patent application and found that the catalyst has an unknown and unique structure that nitrogen atoms of the salen-ligand is not coordinated with a metal but only oxygen atoms are coordinated with the metal. (Example 1, Sung Jae Na, Sujith S, Anish Cyriac, Bo Eun Kim, Jina Yoo, Youn K. Kang, Su Jung Han, Chongmok Lee, and Bun Yeoul Lee* "Elucidation of the Structure of A Highly Active Catalytic System for CO$_2$/Epoxide Copolymerization: A Salen-Cobaltate Complex of An Unusual Binding Mode" *Inorg. Chem.* 2009, 48, 10455-10465).

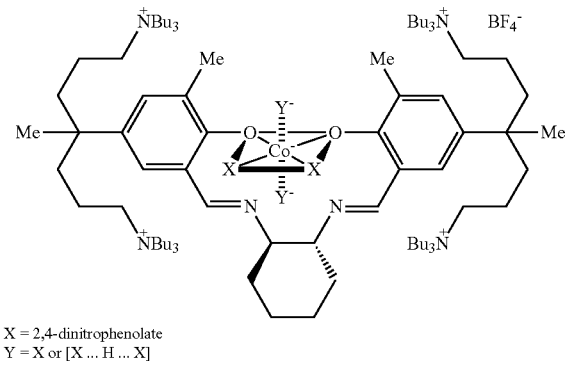

X = 2,4-dinitrophenolate
Y = X or [X ... H ... X]

Also, a method of easily synthesizing the ligand of the compound in Example 1 has been developed (Min, J.; Seong, J. E.; Na, S. J.; Cyriac, A.; Lee, B. Y. *Bull. Korean Chem. Soc.* 2009, 30, 745-748).

The high-molecular weight poly(alkylene carbonate) can be economically prepared by using the compound in the Structure 1 as the highly active catalyst. However, the poly (alkylene carbonate) itself has a limitation in application field.

DISCLOSURE

Technical Problem

An object of the present invention is to provide a method for preparing block or graft copolymers of various polymer compounds and poly(alkylene carbonate) prepared through alternating-copolymerization of carbon dioxide and epoxide by introducing the polymer compound having a functional group of hydroxyl or carboxylic acid in the alternating copolymerization of carbon dioxide and epoxide using a pre-developed catalyst showing high activity, and block or graft copolymers prepared by the same method. The block or graft copolymers according to the present invention permit diverse usages of the copolymers of carbon dioxide and epoxide.

Technical Solution

To achieve the object of the present invention, provided is a method for preparing block or graft copolymers of poly (alkylene carbonate) and a polymer compound, comprising carrying out alternating copolymerization of carbon dioxide and one or more epoxide compounds selected from the group consisting of (C2-C20)alkyleneoxide with or without halogen, (C1-C20)alkyloxy, (C6-C20)aryloxy or (C6-C20)ar(C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20) alkyloxy, (C6-C20)aryloxy, (C6-C20)ar(C1-C20) alkyloxy or (C1-C20)alkyl substituent(s), in the presence of the polymer compound containing a hydroxyl or carboxyl acid group at an end thereof or branched chain, by using a complex of Chemical Formula 1 as a catalyst:

[Chemical Formula 1]

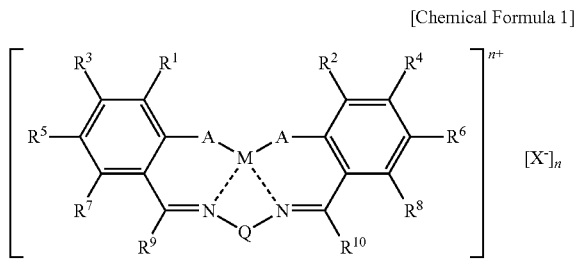

wherein

M represents trivalent cobalt or trivalent chromium;

A represents an oxygen or sulfur atom;

Q represents a diradical for linking two nitrogen atoms;

$R^1$ to $R^{10}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20) alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal;

two of the $R^1$ to $R^{10}$ may be linked to each other to form a ring;

at least one of the hydrogen included in the $R^1$ to $R^{10}$ and Q is a protonated group selected from the group consisting of Chemical Formula a, Chemical Formula b and Chemical Formula c;

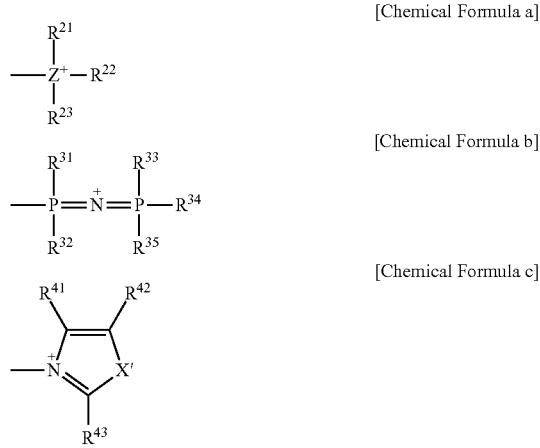

[Chemical Formula a]

[Chemical Formula b]

[Chemical Formula c]

$X^-$ independently represent a halogen anion; $HCO_3^-$; $BF_4^-$; $ClO_4^-$; $NO_3^-$; $PF_6^-$; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-C20)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20)alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-C20)arylcarbamate anion with at least one of halogen, nitrogen, oxygen, silicon, sulfur and phosphorus atoms;

Z represents a nitrogen or phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{21}$, $R^{22}$ and $R^{23}$ or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{41}$, $R^{42}$ and $R^{43}$ may be linked to each other to form a ring;

X' represents an oxygen atom, a sulfur atom or N—R wherein R represents (C1-C20)alkyl;

n represents an integer of adding 1 to the total number of protonated groups contained in $R^1$ to $R^{10}$ and Q;

$X^-$ is coordinated or de-coordinated with M;

Nitrogen atom of imine is coordinated or de-coordinated with M.

The patent related to copolymerization of carbon dioxide/epoxide using the compound of Chemical Formula 1 as a catalyst, which is filed by the present inventor, has been registered and published in a journal (KR Patent No. 10-0853358; *J. Am. Chem. Soc.* 2007, 129, 8082-8083; *Angew. Chem. Int. Ed.*, 2008, 47, 7306-7309). However, copolymerization carried out in the presence of a polymer compound containing a hydroxyl or carboxyl acid group at an end thereof or branched chain has not been published. Copolymerization of carbon dioxide and epoxide in the process of growing polymer chain in the presence of a polymer compound containing a hydroxyl or carboxyl acid group at an end thereof or branched chain starts when $X^-$ contained in catalyst with the type of Chemical Formula 1 above undergoes nucleophilic attack on epoxide coordinated to the metal which work as Lewis acid. When polymerization begins, polymer chains start growing from $X^-$ contained in the catalyst, and in the end, $X^-$ becomes a polymer chain having a carbonate or alkoxy anion at an end thereof. The carbonate or alkoxy anion becomes a compound in a form of an alcohol or carbonic acid by taking protons of the hydroxyl or carboxyl acid group contained in the additionally introduced polymer compound that contains the hydroxyl or carboxyl acid group at an end thereof or branched chain. The polymer compound containing a hydroxyl or carboxyl acid group at an end thereof or branched chain becomes a carboxyl or alkoxy anion. A polymer chain may grow through the carboxyl or alkoxy anion obtained from the polymer compound containing a hydroxyl or carboxyl acid group at an end thereof or branched chain. Proton exchange reaction may occur very quickly and polymer materials obtained by the proton exchange reaction and chain growth reaction have the polymer chain grown from $X^-$ contained in the initial catalyst and the polymer chain grown from the polymer compound containing the introduced hydroxyl or carboxyl acid group at an end thereof or branched chain. Since the polymer compound containing the additionally introduced hydroxyl or carboxyl acid group at an end thereof or branched is the polymer compound above, the compound obtained by the copolymerization is a block copolymer.

In Chemical Formula 1, a complex satisfying that the M represents a trivalent cobalt; A represents oxygen; Q represents trans-1,2-cyclohexylene, phenylene or ethylene; $R^1$ and $R^2$ are the same as or different from primary (C1-C20)alkyl; $R^3$ through $R^{10}$ independently represent hydrogen or —[$YR^{51}_{3-a}\{(CR^{52}R^{53})_b N^+ R^{54}R^{55}R^{56}\}_a$]; Y represents C or Si; $R^{51}$, $R^{52}$, $R^{53}$, $R^{54}$, $R^{55}$ and $R^{56}$ independently represent, hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring;

a represents an integer of 1 to 3, and b represents an integer of 1 to 20;

n represents an integer of 4 or more as a value of adding 1 to a total number of quaternary ammonium salts contained in $R^3$ through $R^{10}$; provided that when a represents 1, at least three of $R^3$ through $R^{10}$ represents —[$YR^{51}_{3-a}\{(CR^{52}R^{53})_b N^+ R^{54}R^{55}R^{56}\}_a$], when a represents 2, at least two of $R^3$ through $R^{10}$ represents —[$YR^{51}_{3-a}\{(CR^{52}R^{53})_b N^+ R^{54}R^{55}R^{56}\}_a$], when a represents 3, at least one of $R^3$ through $R^{10}$ represents —[$YR^{51}_{3-a}\{(CR^{52}R^{53})_b N^+ R^{54}R^{55}R^{56}\}_a$] is used as a catalyst.

That is, as the catalyst, the complex of Chemical Formula 2 below is used.

[Chemical Formula 2]

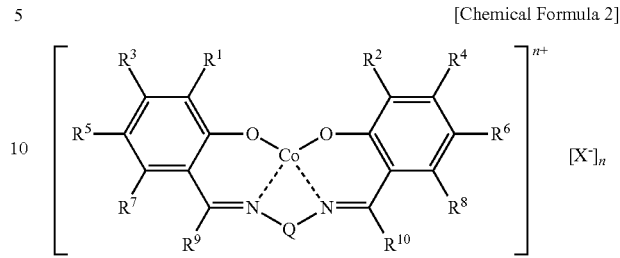

wherein

Q represents trans-1,2-cyclohexylene, phenylene or ethylene;

$R^1$ and $R^2$ are same to or different from primary (C1-C20)alkyl;

$R^3$ through $R^{10}$ independently represent hydrogen or —[$YR^{51}_{3-a}\{(CR^{52}R^{53})_b N^+ R^{54}R^{55}R^{56}\}_a$];

Y represents C or Si;

$R^{51}$, $R^{52}$, $R^{53}$, $R^{54}$, $R^{55}$ and $R^{56}$ independently represent, hydrogen; halogen; (C1-C20) (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal, two of $R^{54}$, $R^{55}$ and $R^{56}$ may be linked to each other to form a ring;

a represents an integer of 1 to 3, and b represents an integer of 1 to 20;

$X^-$ independently represent a halogen anion; $HCO_3^-$; $BF_4^-$; $ClO_4^-$; $NO_3^-$; $PF_6^-$; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-C20)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20)alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-

C20)arylcarbamate anion with at least one of halogen, nitrogen, oxygen, silicon, sulfur and phosphorus atoms;

the total number of quaternary ammonium salts contained in $R^3$ through $R^{10}$ represents an integer of 3 or more; and n represents an integer of 4 or more as a value of adding 1 to the total number of quaternary ammonium salts contained in $R^3$ through $R^{10}$.

As represented by Chemical Formula 2, when $R^1$ and $R^2$ represent primary alkyl and the number of quaternary ammonium salts contained in the compound is 3 or more, a unique coordination structure that nitrogens of imine of the structure 1 are not coordinated is formed in the polymerization process. Accordingly, it is revealed that the carbon dioxide/epoxide copolymerization shows especially high activity (*Inorg. Chem.* 2009, 48, 10455-10465; Bulletin of Korean Chemical Society 2010, published; KR Patent Publication No. 10-2008-0074435 (2008, Jul. 30)). However, carbon dioxide/epoxide copolymerization carried out by using the above-mentioned type of catalyst in the presence of a polymer compound containing a hydroxyl or carboxyl acid group at an end thereof or branched chain has not been published.

More preferably, a complex of Chemical Formula 3 is used as the catalyst.

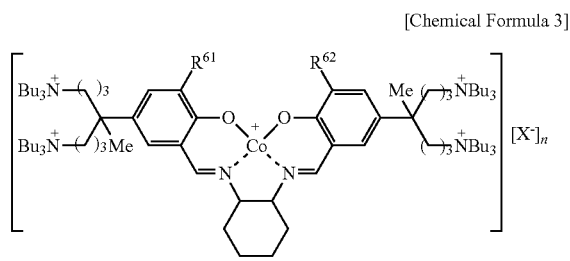

[Chemical Formula 3]

wherein $R^{61}$ and $R^{62}$ independently represent methyl or ethyl; $X^-$ independently represents a nitrate or acetate anion; nitrogen of imine is coordinated or de-coordinated with cobalt, and each $X^-$ is coordinated or de-coordinated with cobalt.

The complex of Chemical Formula 3 as the most preferred compound to be commercialized as a catalyst that can be easily synthesized in bulk has been published by the present inventors (*Bull. Korean Chem. Soc.* 2009, 30, 745-748). However, carbon dioxide/epoxide copolymerization carried out by using the above-mentioned type of catalyst in the presence of a polymer compound containing a hydroxyl or carboxyl acid group at an end thereof or branched chain has not been published.

A polymer compound containing a hydroxyl or carboxyl acid group at an end thereof or branched chain is selected from Chemical Formulas 4 to 12 below:

$R^{70}$—[O-L]$_m$—OH      [Chemical Formula 4]

wherein $R^{70}$ represents hydrogen or (C1-C30)hydrocarbyl with or without an ether, ester, or amino group; m is equal to the number of Ls in one chain; L represents (C1-C30)hydrocarbyl diradical and m Ls contained in one chain are the same or different from each other; a number average molecular weight (Mn) of the polymer compound of Chemical Formula 4 is 500 to 500,000, $HO_2C$—[E-$CO_2$—F—$O_2C$]$_m$-E-$CO_2H$      [Chemical Formula 5]

HO—[F—$O_2$C-E-$CO_2$]$_m$—F—OH      [Chemical Formula 6]

$HO_2C$-[E-$CO_2$—F—$O_2C$]$_m$-E-$CO_2$—F—OH      [Chemical Formula 7]

wherein

E represents (C1-C30)hydrocarbyl diradical, and m Es contained in one chain are the same or different from each other wherein m is equal to the number of Es in one chain; F represent (C2-C30)hydrocarbyl diradical with or without an ether, ester, or amino group and m Fs contained in one chain are the same or different from each other wherein m is equal to the number of Fs in one chain; a number average molecular weight (Mn) of the polymer compound of Chemical Formulas 5 to 7 is 500 to 500,000, {HO-[G-$CO_2$]$_m$}$_f$—$R^{90}$      [Chemical Formula 8]

wherein

G represents (C1-C15)hydrocarbyl diradical and m Gs contained in one chain are the same or different from each other wherein m is equal to the number of Gs in one chain; f represents an integer of 1 to 4, when f represents 1, $R^{90}$ represents hydrogen, (C1-C30)hydrocarbyl, (C1-C30)alkylcarbonyl or (C6-C30)arylcarbonyl, when f represents 2, $R^{90}$ represents (C1-C30)hydrocarbyl diradical, when f represents 3, $R^{90}$ represents (C1-C30)hydrocarbyl triradical, and when f represents 4, $R^{90}$ represents (C1-C30)hydrocarbyl tetraradical; and a number average molecular weight (Mn) of a polymer compound of Chemical Formula 8 is 500 to 500,000:

HO-[Q-OC(O)O]$_m$-Q-OH      [Chemical Formula 9]

wherein

Q independently represents (C1-C30)hydrocarbyl diradical and m Qs contained in one chain are the same or different from each other wherein m is equal to the number of Qs in one chain;

a number average molecular weight (Mn) of the polymer compound of Chemical Formula 9 is 500 to 500,000:

HO—[($R^{111}$)($R^{112}$)Si—O]$_m$—$R^{113}$      [Chemical Formula 10]

wherein $R^{111}$ and $R^{112}$ independently represent (C1-C15)hydrocarbyl radical; $R^{113}$ represents hydrogen or (C1-C30)hydrocarbyl;

a number average molecular weight (Mn) of the polymer compound of Chemical Formula 10 is 500 to 500,000:

$R^{100}$—[T]$_m$-JH      [Chemical Formula 11]

-{[T]$_x$-[$CH_2CR^{121}$(JH)]$_y$}$_m$—      [Chemical Formula 12]

wherein

T represents —$CH_2CH_2$—, —$CH_2CH(CH_3)$—, —$CH_2CH(CH_2CH_3)$—, —$CH_2CH(CH_2CH_2CH_3)$—, —$CH_2CH(CH_2CH_2CH_2CH_2CH_3)$—, —$CH_2CH(C_6H_5)$—, —$CH_2CH(CO_2Me)$—, —$CH_2CH(Cl)$—, —$CH_2C(Me)(CO_2Me)$—, —$CH_2CH(OC(O)CH_3)$—, —$CH_2CH$=$CHCH_2$—, —CH(Me)CH=$CHCH_2$— or —CH(Cl)CH=$CHCH_2$— and Ts contained in one chain may be the same or different from each other; $R^{100}$ represents HJ-, hydrogen, (C1-C20)hydrocarbyl, (C1-C20)alkoxy, (C1-C20)alkylcarbonyloxy or (C6-C20)arylcarbonyloxy; $R^{121}$ represents hydrogen or methyl; J represents —O— or —$CO_2$—; a number average molecular weight (Mn) of the polymer compound of Chemical Formulas 11 and 12 is 500 to 500,000.

The compound of Chemical Formula 4 is easily prepared by reaction of Schemes 1 and 2 below:

[Scheme 1]

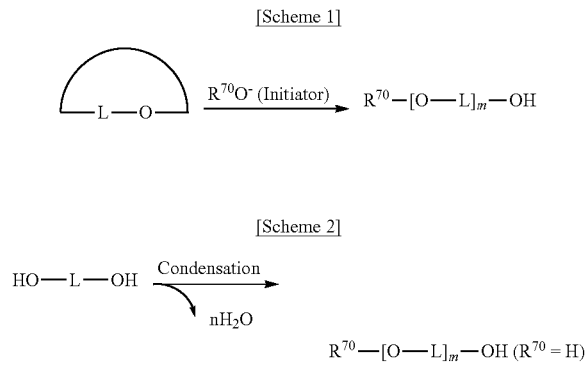

Molecular weight of the introduced polymer compound is not limited but it is preferably 500 or more in order to realize the physical property of the obtained block copolymers. When a polymer having larger molecular weight than a predetermined value is introduced, the number of mols of the hydroxyl or carboxyl acid group contained in the introduced polymer becomes smaller than the number of mols of anion $X^-$ contained in the catalyst in spite of introduction of a lot of polymers. Accordingly, polymer chains mostly growing from $X^-$ are obtained and it is not possible to achieve its object. An extreme value of a turnover number (TON) that can be realized with the catalyst having the structure of Chemical Formula 1 is about 50,000. For example, when the polymer of molecular weight 500,000 of 1 mol (500 Kg) containing $R^{70}$ which is not hydrogen but alkyl, propylene oxide of 100,000 mols (5,800 Kg) and a catalyst of 1 mol (about 1.5 Kg) are introduced into a reactor and polymerization under the pressure of carbon dioxide are carried out, the maximum amount of obtained polymers is 5,000 Kg (equal to TON 50,000, except the introduced polymer of 500 Kg). An amount of poly(propylene carbonate) growing from the introduced polymer chain is ⅙ of the entire amount and the rest is a polymer chain growing from $X^-$. When the same activity is realized by introducing the polymer of 5 mols, the amount of poly(propylene carbonate) growing from the polymer chain becomes the same as that of polymer chains growing from $X^-$. Based on the above calculation, the maximum molecular weight of the polymer to be introduced to prepare block copolymers is limited to 500,000.

The compounds of Chemical Formulas 5 to 7 may be prepared by condensation reaction of $HO_2C$-E-$CO_2H$ and HO—F—OH.

The compound of Chemical Formula 8 is prepared by ring opening polymerization of Scheme 3 below. $R^{90}$ may be modified according to an initiator.

[Scheme 3]

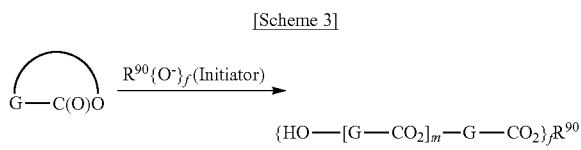

The compound of Chemical Formula 9 may be prepared by condensation reaction of dimethylcarbonate or diethylcarbonate and HOQ-OH.

The compound of Chemical Formula 10 may be prepared by ring opening polymerization of Scheme 4.

[Scheme 4]

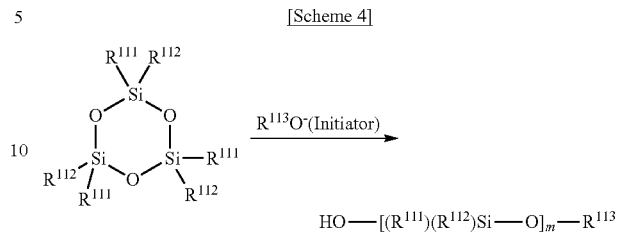

The compound of Chemical Formula 11 may be prepared by carrying out radical, anion, or cation polymerization on the olefin compound corresponding to each T.

The compound of Chemical Formula 12 may be prepared by hydrolysis after carrying out copolymerization on the olefin compound corresponding to each T and $CH_2$=C(Me)($CO_2H$) or $CH_2$=CH($CO_2H$) by using a proper initiator, or after carrying out copolymerization on the olefin compound corresponding to each T and $CH_2$=C(Me)($CO_2Me$), $CH_2$=CH($CO_2Me$), or $CH_2$=CH(O(O)CMe) compound by using a radical and a proper initiator. Since the amount of the hydroxyl or carboxyl acid group contained in the introduced polymer is not limited by the molecular weight of the introduced polymer, the molecular weight of the introduced polymer is not also limited. In addition, it is not affected by an aspect of an end.

In Chemical Formula 4, it is preferred that $R^{70}$ represents hydrogen or (C1-C15)alkyl, and L represents —$CH_2CH_2$—, —$CH_2CH(CH_3)$— or —$CH_2CH_2CH_2CH_2$—. In Chemical Formulas 5 to 7, E represents —$CH_2CH_2$—, —$CH_2CH_2CH_2$—, —$CH_2CH_2CH_2CH_2$—, para-phenylene, or 2,6-naphthalenediyl, F represents —$CH_2CH_2OCH_2CH_2$—, —$CH_2CH_2$—, —$CH_2CH(CH_3)$—, —$CH_2CH_2CH_2$—, —$CH_2C(CH_3)_2CH_2$—, —$CH_2CH(CH_3)CH_2$— or —$CH_2CH_2CH_2CH_2CH_2CH_2$—.

In Chemical Formula 8, it is preferred that G represents —$CH_2$—, —$CH(CH_3)$—, —$CH(CH_3)CH_2$—, —$CH(CH_2CH_3)CH_2$— or —$CH_2CH_2CH_2CH_2CH_2$—, and $R^{90}$ represents hydrogen, (C1-C8)alkyl or (C2-C8)alkylcarbonyl.

In Chemical Formula 9, it is preferred that Q represents —$CH_2CH_2CH_2CH_2$— or —$CH_2CH_2CH_2CH_2CH_2CH_2$—.

In Chemical Formula 10, it is preferred that $R^{111}$ and $R^{112}$ independently represent methyl or phenyl, and $R^{113}$ represents hydrogen or (C1-C8)alkyl.

In Chemical Formulas 11 and 12, T may be selected from the group consisting of —$CH_2CH_2$—, —$CH_2CH(CH_3)$—, —$CH_2CH(CH_2CH_3)$—, —$CH_2CH(CH_2CH_2CH_2CH_3)$—, —$CH_2CH(CH_2CH_2CH_2CH_2CH_2CH_3)$—, —$CH_2CH(C_6H_5)$—, —$CH_2CH(CO_2Me)$—, —$CH_2CH(Cl)$—, —$CH_2C(Me)(CO_2Me)$—, —$CH_2CH(OC(O)CH_3)$—, —$CH_2CH$=$CHCH_2$—, —$CH(Me)CH$=$CHCH_2$— or —$CH(Cl)CH$=$CHCH_2$.

In Chemical Formula 11, it is preferred that J represents —O—, T represents —$CH_2CH_2$— or —$CH_2CH(CH_2CH_3)$—, $R^{10}$ represents hydrogen or HO—, or that J represents —$CO_2$—, T represents —$CH_2CH(C_6H_5)$—, $R^{100}$ represents $HO_2C$— or butyl. A compound that J represents —$CO_2$—, T represents —$CH_2CH(C_6H_5)$—, $R^{100}$ represents $HO_2C$— or butyl may be prepared by carrying out anion polymerization on styrene and terminating reaction with $CO_2$.

In Chemical Formula 12, it is preferred that T represents —CH$_2$CH$_2$—, —CH$_2$CH(C$_6$H$_5$)—, —CH$_2$CH(CO$_2$Me)—, —CH$_2$CH(Cl)— or —CH$_2$C(Me)(CO$_2$Me)—, R$^{121}$ represents hydrogen or methyl, and J represents —CO$_2$—.

The polymer compounds are the commonly used polymer compounds that can be purchased from the companies such as Aldrich Company.

In the preparation method, particular examples of the epoxide compound that may be used herein include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbornene, limonene oxide, dieldrin, 2,3-epoxidepropyl benzene, styrene oxide, phenylpropylene oxide, stilbene oxide, chlorostilbene oxide, dichlorostilbene oxide, 1,2-epoxide-3-phenoxypropane, benzyloxymethyl oxirane, glycidyl-methylphenyl ether, chlorophenyl-2,3-epoxidepropyl ether, epoxypropyl methoxyphenyl ether, biphenyl glycidyl ether, glycidyl naphthyl ether, or the like.

The epoxide compound may be used in the polymerization using an organic solvent as a reaction medium. Particular examples of the solvent that may be used herein include aliphatic hydrocarbons such as pentane, octane, decane and cyclohexane, aromatic hydrocarbons, such as benzene, toluene and xylene, and halogenated hydrocarbons such as chloromethane, methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene and bromobenzene. Such solvents may be used alone or in combination. More preferably, bulk polymerization using the monomer itself as a solvent may be performed.

The molar ratio of the epoxide compound to the catalyst, i.e., epoxide compound:catalyst molar ratio may be 1,000-1,000,000, preferably 50,000-200,000. In the process of the copolymerization, carbon dioxide may be used at a pressure ranging from ambient pressure to 100 atm, preferably from 5 atm to 30 atm. The polymerization temperature may be 20° C.-120° C., suitably 50° C.-90° C.

To perform polymerization of poly(alkylene carbonate), batch polymerization, semi-batch polymerization, or continuous polymerization may be used. When using a batch or semi-batch polymerization process, polymerization may be performed for 0.5-24 hours, preferably 0.5-4 hours. A continuous polymerization process may also be performed for an average catalyst retention time of 0.5-4 hours.

As another aspect of the present invention, provided is a method for preparing poly(alkylene carbonate), including: preparing block or graft copolymers of poly(alkylene carbonate) and polymer compound containing a hydroxyl or carboxyl acid group at an end thereof or branched chain according to the method; and separating a catalyst from the prepared block or graft copolymers by forming a composite of the solid inorganic materials or polymer materials and the catalyst by contacting a solution, in which the prepared block or graft copolymers and the catalyst are dissolved, to solid inorganic materials, polymer materials, or a mixture thereof that are not dissolved in the solution.

A method for separating a catalyst after performing carbon dioxide/epoxide copolymerization by using the same catalyst has been published (KR Patent Application No. 10-2008-0015454; Angew. Chem. Int. Ed., 2008, 47, 7306-7309) but a method for separating a catalyst after performing copolymerization by introducing a polymer compound containing a hydroxyl or carboxyl acid group at an end thereof or branched chain selected from Chemical Formulas 4 to 12 is not published.

The solid inorganic material may be surface-modified or non-modified silica or alumina. The solid polymer material may be a polymer material having a functional group capable of inducing deprotonation by alkoxy anion. More particularly, the functional group capable of inducing deprotonation by alkoxy anion may be a sulfonic acid, carboxylic acid, phenol or alcohol group. Examples of solid inorganic materials whose main element is silicon or aluminum containing bronsted acid site providing proton to the alkoxy anion or carbonate anion include silica, alumina, aluminosilicate (zeolite), aluminophosphate, titaniumsilicate, clay, more preferably, surface-modified or non-modified silica or alumina The solid polymer material may have a number average molecular weight of 500-10,000,000 and is preferably crosslinked. However, non-crosslinked polymers may be used as long as they are not dissolved in the solution containing the copolymer and the catalyst. Particular examples of the "polymer material having a functional group capable of inducing deprotonation by alkoxy anion" include copolymer containing a constitutional unit represented by any one of Chemical Formulas I to V in its polymer chain or a homopolymer formed of such constitutional units. Such a polymer material functioning as a support may be non-crosslinked as long as it is not dissolved in the above-mentioned solution. Preferably, the polymer material is suitably crosslinked to provide decreased solubility.

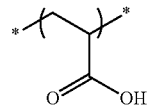

Chemical Formula I

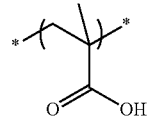

Chemical Formula II

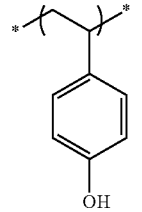

Chemical Formula III

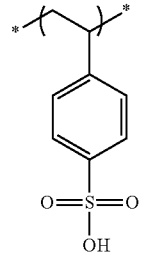

Chemical Formula IV

-continued

Chemical Formula V

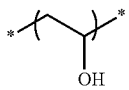

As still another aspect of the present invention, a block copolymer compound selected from Chemical Formulas 13 to 15 is provided. Block copolymers of the poly(alkylene carbonate) and other polymers have not been reported.

W—{CR$^{e1}$R$^{e2}$—CR$^{e3}$R$^{e4}$—OC(O)O}$_d$—CR$^{e1}$R$^{e2}$—CR$^{e3}$R$^{e4}$—OH  [Chemical Formula 13]

wherein

W is selected from R$^{70}$—[O-L]$_m$—O— (Chemical Formula d), HO—CR$^{e3}$R$^{e4}$—CR$^{e1}$R$^{e2}$—{OC(O)O—CR$^{e3}$R$^{e4}$—CR$^{e1}$R$^{e2}$}$_d$—[O-L]$_m$-O— (Chemical Formula e), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O$_2$C—[E-CO$_2$—F—O$_2$C]$_m$-E-CO$_2$— (Chemical Formula f), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O—[F—O$_2$C-E-CO$_2$]$_m$—F—O— (Chemical Formula g), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O$_2$C—[E-CO$_2$—F—O$_2$C]$_m$-E-CO$_2$—F—O— (Chemical Formula h), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O-[G-CO$_2$]$_m$— (Chemical Formula i), HO—CR$^{e3}$CR$^{e4}$—CR$^{e1}$CR$^{e2}$—{OC(O)O—CR$^{e3}$CR$^{e4}$—CR$^{e1}$R$^{e2}$}$_d$—O—[(R$^{111}$)(R$^{112}$)Si—O]$_m$-Q-O— (Chemical Formula j), —O—[(R$^{111}$)(R$^{112}$)Si—O]$_m$—R$^{113}$ (Chemical Formula k), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O—[(R$^{111}$)(R$^{112}$)Si—O]$_m$— (Chemical Formula l), R$^{100}$-[T]$_m$-J- (Chemical Formula m) and HO—CR$^{e3}$R$^{e4}$—CR$^{e1}$R$^{e2}$—{OC(O)O—CR$^{e3}$R$^{e4}$—CR$^{e1}$R$^{e2}$}$_d$-J-[T]$_m$-J- (Chemical Formula n);

R$^{e1}$ to R$^{e4}$ independently represent hydrogen; (C1-C10) alkyl with or without halogen or (C1-C20)alkoxy substituent(s); (C6-C10)aryl with or without halogen or (C1-C20)alkoxy substituent(s), R$^{e1}$ to R$^{e4}$ may be linked to each other to form a ring, and d represents an integer of 10 to 5,000;

R$^{70}$ represents (C1-C30)hydrocarbyl with or without an ether, ester, or amino group;

L represents (C1-C30)hydrocarbyl diradical and m Ls contained in one chain are the same or different from each other wherein m is equal to the number of Ls in one chain;

E represents (C1-C30)hydrocarbyl diradical and m Es contained in one chain are the same or different from each other wherein m is equal to the number of Es in one chain;

F represents (C2-C30)hydrocarbyl diradical with or without an ether, ester, or amino group and m Fs contained in one chain are the same or different from each other wherein m is equal to the number of Fs in one chain; G represents (C1-C15)hydrocarbyl diradical and m Gs contained in one chain are the same or different from each other wherein m is equal to the number of Gs in one chain;

Q independently represents (C1-C30)hydrocarbyl diradical and m Qs contained in one chain are the same or different from each other wherein m is equal to the number of Qs in one chain;

R$^{111}$ and R$^{112}$ independently represent (C1-C15)hydrocarbyl radical; R$^{113}$ represents hydrogen or (C1-C30)hydrocarbyl;

J represents —O— or —CO$_2$—;
T represents —CH$_2$CH$_2$—, —CH$_2$CH(CH$_3$)—, —CH$_2$CH(CH$_2$CH$_3$)—, —CH$_2$CH(CH$_2$CH$_2$CH$_3$)—, —CH$_2$CH(CH$_2$CH$_2$CH$_2$CH$_2$CH$_3$)—, —CH$_2$CH(C$_6$H$_5$)—, —CH$_2$CH(CO$_2$Me)—, —CH$_2$CH(Cl)—, —CH$_2$C(Me)(CO$_2$Me)—, —CH$_2$CH(OC(O)CH$_3$)—, —CH$_2$CH=CHCH$_2$—, —CH(Me)CH=CHCH$_2$— or —CH(Cl)CH=CHCH$_2$— and m Ts contained in one chain are the same or different from each other wherein m is equal to the number of Ts in one chain;

R$^{100}$ represents hydrogen, (C1-C20)hydrocarbyl, (C1-C20)alkoxy, (C1-C20)alkylcarbonyloxy or (C6-C20)arylcarbonyloxy;

a number average molecular weight (Mn) of R$^{70}$-[O-L]$_m$-, —[O-L]$_m$-, —O$_2$C—[E-CO$_2$—F—O$_2$C]$_m$-E-CO$_2$—, —O—[F—O$_2$C-E-CO$_2$]$_m$—F—O—, —O$_2$C—[E-CO$_2$—F—O$_2$C]$_m$ -E-CO$_2$—F—O—, —O—[G-CO$_2$]$_m$—, —O—[Q-OC(O)O]$_m$-Q-O—, —O—[(R$^{111}$)(R$^{112}$)Si—O]$_m$—R$^{113}$, —O—[(R$^{111}$)(R$^{112}$)Si—O]$_m$—, R$^{100}$-[T]$_m$-J- and -J-[T]$_m$-J- block of Chemical Formulas d to n is 500 to 500,000:

{HO—CR$^{e3}$CR$^{e4}$—CR$^{e1}$R$^{e2}$—{OC(O)O—CR$^{e3}$R$^{e4}$—CR$^{e1}$R$^{e2}$}$_d$—O—[G-CO$_2$]$_m$}$_f$-R$^{90}$  [Chemical Formula 14]

wherein

G represents (C1-C15)hydrocarbyl diradical and m Gs contained in one chain are the same or different from each other wherein m is equal to the number of Gs in one chain;

f represents an integer of 1 to 4, when f represents 1, R$^{90}$ represents hydrogen, (C1-C30)hydrocarbyl, (C1-C30)alkylcarbonyl or (C6-C30)arylcarbonyl, when f represents 2, R$^{90}$ represents (C1-C30)hydrocarbyl diradical, when f represents 3, R$^{90}$ represents (C1-C30)hydrocarbyl triradical, when f represents 4, R$^{90}$ represents (C1-C30)hydrocarbyl tetraradical; a number average molecular weight (Mn) of —{O-[G-CO$_2$]$_m$}$_f$—R$^{90}$ block is 500 to 500,000, and R$^{e1}$ to R$^{e4}$ independently represent hydrogen; (C1-C10) alkyl with or without halogen or (C1-C20)alkoxy substituent(s); (C6-C10) aryl with or without halogen or (C1-C20)alkoxy substituent(s), R$^{e1}$ to R$^{e4}$ may be linked to each other to form a ring, and d represents an integer of 10 to 5,000:

-{[T]$_x$-[CH$_2$CR$^{121}$(J-CR$^{e1}$R$^{e2}$—CR$^{e3}$R$^{e4}$—OC(O)O]$_d$—CR$^{e1}$R$^{e2}$—CR$^{e3}$R$^{e4}$—OH)]$_y$}$_m$—  [Chemical Formula 15]

wherein

J represents —O— or —CO$_2$—; T represents —CH$_2$CH$_2$—, —CH$_2$CH(CH$_3$)—, —CH$_2$CH(CH$_2$CH$_3$)—, —CH$_2$CH(CH$_2$CH$_2$CH$_2$CH$_3$)—, —CH$_2$CH(CH$_2$CH$_2$CH$_2$CH$_2$CH$_3$)—, —CH$_2$CH(C$_6$H$_5$)—, —CH$_2$CH(CO$_2$Me)—, —CH$_2$CH(Cl)—, —CH$_2$C(Me)(CO$_2$Me)—, —CH$_2$CH(OC(O)CH$_3$)—, —CH$_2$CH=CHCH$_2$—, —CH(Me)CH=CHCH$_2$— or —CH(Cl)CH=CHCH$_2$— and Ts contained in one chain may be the same or different from each other; R$^{121}$ represents hydrogen or methyl; a number average molecular weight (Mn) of a main chain is 500 to 500,000, and R$^{e1}$ to R$^{e4}$ independently represent hydrogen; (C1-C10) alkyl with or without halogen or (C1-C20)alkoxy substituent(s); and (C6-C10) aryl with or without halogen or (C1-C20)alkoxy substituent(s), R$^{e1}$ to R$^{e4}$ may be linked to each other to form a ring, and d represents an integer of 10 to 50,000.

The maximum turnover number (TON) that can be realized by catalyst used in the present invention is about 50,000. When d is 5,000, the number of grown chains is 10. 5 chains are grown from X$^-$ contained in the catalyst and rest 5 chains are grown from the introduced polymers. That is, when pure poly(alkylenecarbonate) and block copolymers are obtained half and half, it is possible to allow a physical property to the block copolymers.

In Chemical Formula 13, when W represents R$^{70}$—[O-L]$_m$—O— (Chemical Formula d), it is represented by Chemical Formula 13-d.

R$^{70}$—[O-L]$_m$—O—{CR$^{e1}$R$^{e2}$—CR$^{e3}$R$^{e4}$—OC(O)O}$_d$—CR$^{e1}$R$^{e2}$—CR$^{e3}$R$^{e4}$—OH  [Chemical Formula 13-d]

wherein $R^{70}$ represents (C1-C30)hydrocarbyl with or without an ether, ester, or amino group; L represents (C1-C30)hydrocarbyl diradical and m Ls contained in one chain are the same or different from each other wherein m is equal to the number of Ls in one chain; a number average molecular weight (Mn) of $R^{70}$—[O-L]$_m$ block is 500 to 500,000, $R^{e1}$ to $R^{e4}$ independently represent hydrogen; (C1-C10)alkyl with or without halogen or (C1-C20)alkoxy substituent(s); (C6-C10)aryl with or without halogen or (C1-C20)alkoxy substituent(s), $R^{e1}$ to $R^{e4}$ may be linked to each other to form a ring, and d represents an integer of 10 to 5,000.

To be specific, $R^{70}$ of a polymer compound of Chemical Formula 13-d represents (C1-C15)alkyl; L represents —CH$_2$CH$_2$—, —CH$_2$CH(CH$_3$)— or —CH$_2$CH$_2$CH$_2$CH$_2$—; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen, and $R^{e4}$ may be methyl (in the part of the repeat units, $R^{e1}$ represents methyl and the rest $R^{e2}$ through $R^{e4}$ represents hydrogen).

In Chemical Formula 13, W represents HO—CR$^{e3}$R$^{e4}$—CR$^{e1}$R$^{e2}$—{OC(O)O—CR$^{e3}$R$^{e4}$—CR$^{e1}$R$^{e2}$}$_d$—[O-L]$_m$—O— (Chemical Formula e), it is represented by Chemical Formula 13-e.

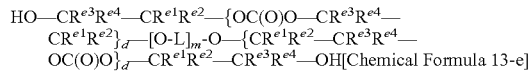 [Chemical Formula 13-e]

wherein

L represents (C1-C30)hydrocarbyl diradical and m Ls contained in one chain are the same or different from each other wherein m is equal to the number of Ls in one chain; a number average molecular weight (Mn) of [O-L]$_m$ block represents 500 to 500,000, $R^{e1}$ to $R^{e4}$ independently represent hydrogen; (C1-C10)alkyl with or without halogen or (C1-C20)alkoxy substituent(s); (C6-C10)aryl with or without halogen or (C1-C20)alkoxy substituent(s), $R^{e1}$ to $R^{e4}$ may be linked to each other to form a ring, and d represents an integer of 10 to 5,000.

To be specific, L of the polymer compound of Chemical Formula 13-e represents —CH$_2$CH$_2$—, —CH$_2$CH(CH$_3$)— or —CH$_2$CH$_2$CH$_2$CH$_2$—; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen, $R^{e4}$ may represent methyl(in the part of the repeat units, $R^{e1}$ represents methyl and the rest $R^{e2}$ to $R^{e4}$ represent hydrogen).

In Chemical Formula 13, when W represents HO—CR$^{e3}$R$^{e4}$—CR$^{e1}$R$^{e2}$—{OC(O)O—CR$^{e3}$R$^{e4}$—CR$^{e1}$R$^{e2}$}$_d$—O$_2$C-[E-CO$_2$—F—O$_2$C]$_m$-E-CO$_2$— (Chemical Formula f), HO—CR$^{e3}$R$^{e4}$—CR$^{e1}$R$^{e2}$—{OC(O)O—CR$^{e3}$R$^{e4}$—CR$^{e1}$R$^{e2}$}$_d$—O—[F—O$_2$C-E-CO$_2$]$_m$—F—O— (Chemical Formula g) or HO—CR$^{e3}$R$^{e4}$—CR$^{e1}$R$^{e2}$—{OC(O)O—CR$^{e3}$R$^{e4}$—CR$^{e1}$R$^{e2}$}$_d$—O$_2$C—[E-CO$_2$—F—O$_2$C]$_m$-E-CO$_2$—F—O— (Chemical Formula h), it is represented by Chemical Formula 13-f, Chemical Formula 13-g or Chemical Formula 13-h.

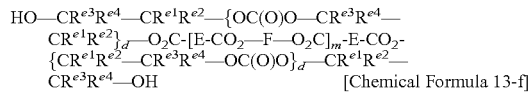 [Chemical Formula 13-f]

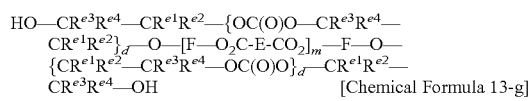 [Chemical Formula 13-g]

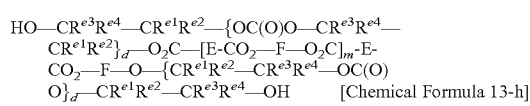 [Chemical Formula 13-h]

wherein

E represents (C1-C30)hydrocarbyl diradical and m Es contained in one chain are the same or different from each other wherein m is equal to the number of Es in one chain; F represents (C2-C30)hydrocarbyl diradical with or without an ether, ester, or amino group and m Fs contained in one chain are the same or different from each other wherein m is equal to the number of Fs in one chain; a number average molecular weight (Mn) of —O$_2$C—[E-CO$_2$—F—O$_2$C]$_m$-E-CO$_2$—, —O—[F—O$_2$C-E-CO$_2$]$_m$—F—O—, or —O$_2$C-[E-CO$_2$—F—O$_2$C]$_m$-E-CO$_2$—F—O— block is 500 to 500,000, $R^{1e}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, and d represents an integer of 10 to 5,000.

To be specific, E of the polymer compound of Chemical Formulas 13-g to 13-h represents —CH$_2$CH$_2$—, —CH$_2$CH$_2$CH$_2$—, —CH$_2$CH$_2$CH$_2$CH$_2$—, para-phenylene, or 2,6-naphthalenediyl, F represents —CH$_2$CH$_2$OCH$_2$CH$_2$—, —CH$_2$CH$_2$—, —CH$_2$CH(CH$_3$)—, —CH$_2$CH$_2$CH$_2$—, —CH$_2$C(CH$_3$)$_2$CH$_2$—, —CH$_2$CH(CH$_3$)CH$_2$— or —CH$_2$CH$_2$CH$_2$CH$_2$CH$_2$CH$_2$—, $R^{e1}$ to $R^{e4}$ independently represent hydrogen or methyl, preferably $R^{e1}$ to $R^{e4}$ represent hydrogen, or $R^{e1}$ to $R^{e3}$ represent hydrogen, $R^{e4}$ may represent methyl(in the part of the repeat units, $R^{e1}$ represents methyl and the rest $R^{e2}$ to $R^{e4}$ represent hydrogen).

In Chemical Formula 13, when W represents HO—CR$^{e3}$R$^{e4}$—-CR$^{e1}$R$^{e2}$—{OC(O)O—CR$^{e3}$R$^{e4}$—CR$^{e1}$R$^{e2}$}$_d$—O—[G-CO$_2$]$_m$— (Chemical Formula i), it is represented by Chemical Formula 13-i.

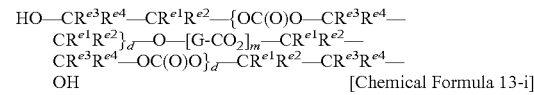 [Chemical Formula 13-i]

wherein

G represents (C1-C15)hydrocarbyl diradical and m Gs contained in one chain are the same or different from each other wherein m is equal to the number of Gs in one chain; a number average molecular weight (Mn) of —O-[G-CO$_2$]$_m$— block is 500 to 500,000, $R^{e1}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, d represents an integer of 10 to 5,000.

To be specific, G of the polymer compound of Chemical Formula 13-I represents —CH$_2$—, —CH(CH$_3$)—, —CH(CH$_3$)CH$_2$—, —CH(CH$_2$CH$_3$)CH$_2$— or —CH$_2$CH$_2$CH$_2$CH$_2$CH$_2$—; $R^{e1}$ to $R^{e4}$ independently represent hydrogen or methyl, preferably, $R^{e1}$ to $R^{e4}$ are hydrogen, or $R^{e1}$ to $R^{e3}$ are hydrogen, $R^{e4}$ may represent methyl(in the part of the repeat units, $R^{e1}$ represents methyl and the rest $R^{e2}$ to $R^{e4}$ represent hydrogen).

In Chemical Formula 13, when W represents HO—CR$^{e3}$R$^{e4}$—CR$^{e1}$R$^{e2}$—{OC(O)O—CR$^{e3}$R$^{e4}$—CR$^{e1}$R$^{e2}$}$_d$—O—[Q-OC(O)O]$_m$-Q-O— (Chemical Formula j), it is represented by Chemical Formula 13-j below.

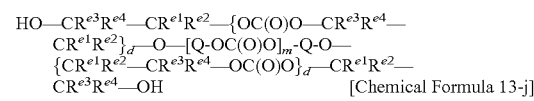 [Chemical Formula 13-j]

wherein

Q independently represents (C1-C30)hydrocarbyl diradical and m Qs contained in one chain are the same or different from each other wherein m is equal to the number of Qs in one chain; a number average molecular weight (Mn) of —O—[Q-OC(O)O]$_m$-Q-O— block is 500 to 500,000, $R^{e1}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, d represents an integer of 10 to 5,000.

To be specific, Q of the polymer compound of Chemical Formula 13-j represents —CH$_2$CH$_2$CH$_2$CH$_2$— or —CH$_2$CH$_2$CH$_2$CH$_2$CH$_2$CH$_2$—; $R^{e1}$ to $R^{e4}$ independently represent hydrogen or methyl, preferably, $R^{e1}$ to $R^{e4}$ represent hydrogen, or $R^{e1}$ to $R^{e4}$ represent hydrogen, $R^{e4}$ represent methyl(in the part of the repeat units, $R^{e1}$ represent methyl and the rest $R^{e2}$ to $R^{e4}$ represent hydrogen).

In Chemical Formula 13, when W represents —O—[(R$^{111}$)(R$^{112}$)Si—O]$_m$—R$^{113}$ (Chemical Formula k), it is represented by Chemical Formula 13-k.

[Chemical Formula 13-k]

wherein

R$^{111}$ and R$^{112}$ independently represent (C1-C15)hydrocarbyl radical; R$^{113}$ represents hydrogen or (C1-C30)hydrocarbyl; a number average molecular weight (Mn) of —O—[(R$^{111}$)(R$^{112}$)Si—O]$_m$—R$^{113}$ block is 500 to 500,000, $R^{e1}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, d represents an integer of 10 to 5,000.

To be specific, R$^{111}$ and R$^{112}$ of the polymer compound of Chemical Formula 13-k independently represent methyl or phenyl; R$^{113}$ represents hydrogen or (C1-C8)alkyl; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen, $R^{e4}$ may represent methyl(in the part of the repeat units, $R^{e1}$ represent methyl and the rest $R^{e2}$ to $R^{e4}$ represent hydrogen).

In Chemical Formula 13, when W represents HO—CR$^{e3}$R$^{e4}$—CR$^{e1}$R$^{e2}$—{OC(O)O—CR$^{e3}$R$^{e4}$—CR$^{e1}$R$^{e2}$}$_d$—O—[R$^{111}$)(R$^{112}$)Si—O]$_m$— (Chemical Formula l), it is represented by Chemical Formula 13-l.

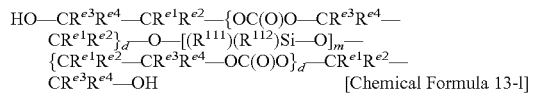
[Chemical Formula 13-l]

wherein

R$^{111}$ and R$^{112}$ independently represent (C1-C15)hydrocarbyl radical; a number average molecular weight (Mn) of —O—[(R$^{111}$)(R$^{112}$)Si—O]$_m$— block is 500 to 500,000, $R^{e1}$ to $R^{e4}$ independently represent hydrogen; (C1-C10) alkyl with or without halogen or (C1-C20)alkoxy substituent(s); and (C6-C10) aryl with or without halogen or (C1-C20) alkoxy substituent(s), $R^{e1}$ to $R^{e4}$ may be linked to each other to form a ring, and d represents an integer of 10 to 5,000.

To be specific, R$^{111}$ and R$^{112}$ of the polymer compound of Chemical Formula 13-l independently represent methyl or phenyl; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen, and $R^{e4}$ represents methyl(in the part of the repeat units, $R^{e1}$ represents methyl and the rest $R^{e2}$ to $R^{e4}$ represent hydrogen).

In Chemical Formula 13, when W represents $R^{100}$-[T]$_m$-J- (Chemical Formula m), it is represented by Chemical Formula 13-m below.

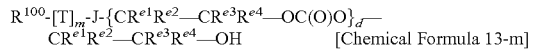
[Chemical Formula 13-m]

wherein

J represents —O— or —CO$_2$—; T represents —CH$_2$CH$_2$—, —CH$_2$CH(CH$_3$)—, —CH$_2$CH(CH$_2$CH$_3$)—, —CH$_2$CH(CH$_2$CH$_2$CH$_2$CH$_3$)—, —CH$_2$CH(CH$_2$CH$_2$CH$_2$CH$_2$CH$_2$CH$_3$)—, —CH$_2$CH(C$_6$H$_5$)—, —CH$_2$CH(CO$_2$Me)—, —CH$_2$CH(Cl)—, —CH$_2$C(Me)(CO$_2$Me)—, —CH$_2$CH(OC(O)CH$_3$)—, —CH$_2$CH=CHCH$_2$—, —CH(Me)CH=CHCH$_2$— or —CH(Cl)CH=CHCH$_2$— and m Ts contained in one chain are the same or different from each other wherein m is equal to the number of Ts in one chain; R$^{100}$ represents hydrogen, (C1-C20)hydrocarbyl, (C1-C20)alkoxy, (C1-C20)alkylcarbonyloxy or (C6-C20)arylcarbonyloxy; a number average molecular weight (Mn) of R$^{100}$-[T]$_m$-J- block is 500 to 500,000, $R^{e1}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, d represents an integer of 10 to 50,000.

T of Chemical Formula 13-m may be selected from —CH$_2$CH$_2$—, —CH$_2$CH(CH$_3$)—, —CH$_2$CH(CH$_2$CH$_3$)—, —CH$_2$CH(CH$_2$CH$_2$CH$_2$CH$_3$)—, —CH$_2$CH(CH$_2$CH$_2$CH$_2$CH$_2$CH$_2$CH$_3$)—, —CH$_2$CH(C$_6$H$_5$)—, —CH$_2$CH(CO$_2$Me)—, —CH$_2$CH(Cl)—, —CH$_2$C(Me)(CO$_2$Me)—, —CH$_2$CH(OC(O)CH$_3$)—, —CH$_2$CH=CHCH$_2$—, —CH(Me)CH=CHCH$_2$— or —CH(CDCH=CHCH$_2$—.

To be specific, J of the polymer compound of Chemical Formula 13-m represents —O—; T represents —CH$_2$CH$_2$— or —CH$_2$CH(CH$_2$CH$_3$)—; R$^{100}$ represents hydrogen; $R^{e1}$ to $R^{e4}$ independently represent hydrogen or methyl, preferably, $R^{e1}$ to $R^{e4}$ represents hydrogen, or $R^{e1}$ to $R^{e3}$ represents hydrogen, and $R^{e4}$ represents methyl (in the part of the repeat units, $R^{e1}$ represents methyl and the rest $R^{e2}$ to $R^{e4}$ represents hydrogen). Also, J of the polymer compound of Chemical Formula 13-m represents —CO$_2$—; T represents —CH$_2$CH(C$_6$H$_5$)—; R$^{100}$ represents butyl; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen and $R^{e4}$ may represent methyl(in the part of the repeat units, $R^{e1}$ represents methyl and the rest $R^{e2}$ to $R^{e4}$ represent hydrogen).

In Chemical Formula 13, when W represents HO—CR$^{e3}$R$^{e4}$—CR$^{e1}$R$^{e2}$—{OC(O)O—CR$^{e3}$R$^{e4}$—CR$^{e1}$R$^{e2}$}$_d$-J-[T]$_m$-J- (Chemical Formula n), it is represented by Chemical Formula 13-n.

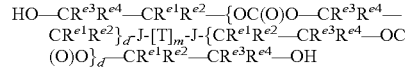

wherein

J represents —O— or —CO$_2$—; T represents —CH$_2$CH$_2$—, —CH$_2$CH(CH$_3$)—, —CH$_2$CH(CH$_2$CH$_3$)—, —CH$_2$CH(CH$_2$CH$_2$CH$_2$CH$_3$)—, —CH$_2$CH(CH$_2$CH$_2$CH$_2$CH$_2$CH$_2$CH$_3$)—, —CH$_2$CH(C$_6$H$_5$)—, —CH$_2$CH(CO$_2$Me)—, —CH$_2$CH(Cl)—, —CH$_2$C(Me)(CO$_2$Me)—, —CH$_2$CH(OC(O)CH$_3$)—, —CH$_2$CH=CHCH$_2$—, —CH(Me)CH=CHCH$_2$— or —CH(Cl)CH=CHCH$_2$— and m Ts contained in one chain are the same or different from each other wherein m is equal to the number of Ts in one chain; R$^{100}$ represents hydrogen, (C1-C20)hydrocarbyl, (C1-C20)alkoxy, (C1-C20)alkylcarbonyloxy or (C6-C20)arylcarbonyloxy; a number average molecular weight (Mn) of -J-[T]$_m$-J- block is 500 to 500,000, $R^{e1}$ to $R^{e4}$ independently represent hydrogen; (C1-C10) alkyl with or without halogen or (C1-C20)alkoxy substituent(s); (C6-C10) aryl with or without halogen or (C1-C20)alkoxy substituent(s), $R^{e1}$ to $R^{e4}$ may be linked to each other to form a ring, d represents an integer of 10 to 50,000.

T of Chemical Formula 13-n may be selected from —$CH_2CH_2$—, —$CH_2CH(CH_3)$—, —$CH_2CH(CH_2CH_3)$—, —$CH_2CH(CH_2CH_2CH_2CH_3)$—, —$CH_2CH(CH_2CH_2CH_2CH_2CH_2CH_3)$—, —$CH_2CH(C_6H_5)$—, —$CH_2CH(CO_2Me)$—, —$CH_2CH(Cl)$—, —$CH_2C(Me)(CO_2Me)$—, —$CH_2CH(OC(O)CH_3)$—, —$CH_2CH=CHCH_2$—, —$CH(Me)CH=CHCH_2$— or —$CH(Cl)CH=CHCH_2$—.

To be specific, J of the polymer compound of Chemical Formula 13-n represents —O—; T represents —$CH_2CH_2$— or —$CH_2CH(CH_2CH_3)$—; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen and et represents methyl(in the part of the repeat units, $R^{e1}$ may represent methyl and the rest $R^{e2}$ to $R^{e4}$ represent hydrogen). Also, J of the polymer compound of Chemical Formula 13-n represents —$CO_2$—; T represents —$CH_2CH(C_6H_5)$—; $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen and $R^{e4}$ may be methyl(in the part of the repeat units, $R^{e1}$ represents methyl and the rest $R^{e2}$ to $R^{e4}$ represent hydrogen).

G of the polymer compound of Chemical Formula 14 represents —$CH_2$—, —$CH(CH_3)$—, —$CH(CH_3)CH_2$—, —$CH(CH_2CH_3)CH_2$— or —$CH_2CH_2CH_2CH_2CH_2$—, $R^{90}$ represents hydrogen, (C1-C8)alkyl or (C2-C8)alkylcarbonyl, $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen and $R^{e4}$ represents methyl(in the part of the repeat units, $R^{e1}$ represents methyl and the rest $R^{e2}$ to $R^{e4}$ represent hydrogen).

T of the polymer compound of Chemical Formula 15 represents —$CH_2CH_2$—, —$CH_2CH(C_6H_5)$—, —$CH_2CH(CO_2Me)$—, —$CH_2CH(Cl)$— or —$CH_2C(Me)(CO_2Me)$—, $R^{121}$ represents hydrogen or methyl, J represents —$CO_2$—, $R^{e1}$ to $R^{e4}$ independently represent hydrogen or methyl, preferably, $R^{e1}$ to $R^{e4}$ represent hydrogen, or $R^{e1}$ to $R^{e3}$ represent hydrogen and $R^{e4}$ may represent methyl(in the part of the repeat units, $R^{e1}$ represents methyl and the rest $R^{e2}$ to $R^{e4}$ represent hydrogen).

Advantageous Effects

The physical properties of poly(alkylene carbonate) itself can be compensated by preparing block or graft copolymers of poly(alkylene carbonate) and a polymer compound having a functional group of hydroxyl or carboxyl acid based on the preparation method according to the present invention, thereby diversifying its usage. Also, the obtained block or graft copolymers are used for easy blending with poly(alkylene carbonate) and various polymers.

BEST MODE

Figure 1:
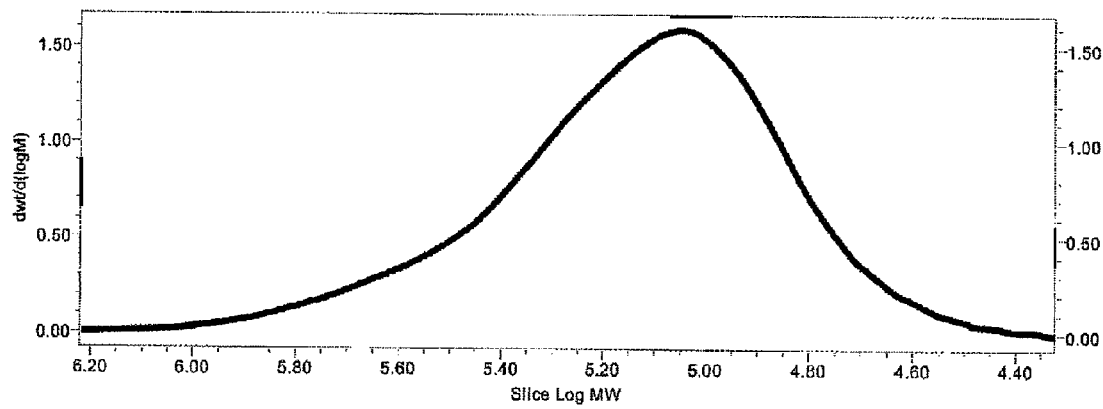
FIG. 1 is a graph showing a gel-permeation chromatography (GPC) curve of polystyrene-poly(propylene carbonate) block copolymers in accordance with Example 13.

Example and Comparative Example below specifically describe the effect of the present invention. However, Example below is not intended to limit the scope of the present invention but only for exemplifying the present invention.

Preparation Example 1

Synthesis of Catalyst

The catalyst used in the present invention was prepared as shown below. A compound as a starting material was synthesized according to the known method. (*Bull. Korean Chem. Soc.* 2009, 30, 745-748).

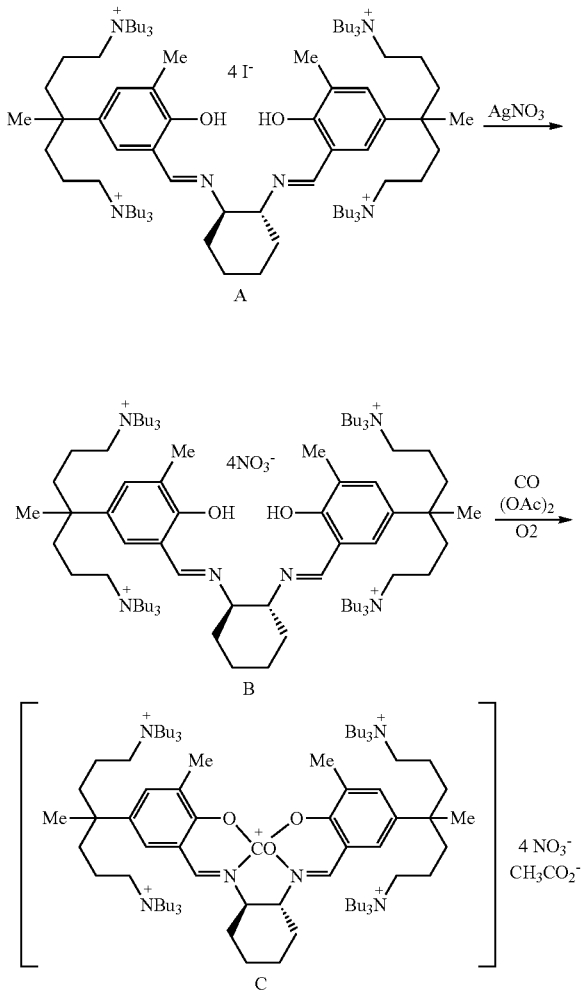

Synthesis of Compound B

The compound A (100 mg, 0.054 mmol) and $AgNO_3$ (37.3 mg, 0.219 mmol) were dissolved in ethanol (3 mL) and stirred overnight. The resultant AgI was removed by filteration over a pad of celite. A solvent was removed by applying vacuum to obtain a yellow compound B as powder (0.80 g, 94%). $^1$H NMR ($CDCl_3$): δ 3.51 (s, 21-1, OH), 8.48 (s, 2H, CH=N), 7.15 (s, 4H, m-H), 3.44 (br, 2H, cyclohexyl-CH), 3.19 (br, 32H, $NCH_2$), 2.24 (s, 6H, $CH_3$), 1.57-1.52 (br, 4H, cyclohexyl-$CH_2$), 1.43-1.26 (br, 74H), 0.90-070. (br, 36H, $CH_3$) ppm.

Synthesis of Compound C

The compound B (95 mg, 0.061 mmol) and Co(OAc)$_2$ (10.7 mg, 0.061 mmol) were added to a flask and dissolved in methylene chloride (3 mL). After stirring the mixture for 3 hours at room temperature under oxygen gas, solvent was removed by applying reduced pressure to obtain a brown compound C as powder (85 mg, 83%). $^1$H NMR (DMSO-d$_6$, 38° C.): major signal set, δ 7.83 (s, 2H, CH=N) 7.27 (br s, 2H, m-H), 7.22, 7.19 (brs, 2H, m-H), 3.88 (br, 1H, cyclohexyl-CH), 3.55 (br, 1H, cyclohexyl-CH), 3.30-2.90 (br, 32H, NCH$_2$), 2.58 (s, 3H, CH$_3$), 2.55 (s, 3H, CH$_3$), 2.10-1.80 (br, 4H, cyclohexyl-CH$_2$), 1.70-1.15 (br m, 74H), 1.0-0.80 (br, 36H, CH$_3$) ppm; minor signal set, δ 7.65 (s, 2H, CH=N) 7.45 (s, 2H, m-H), 7.35 (s, 2H, m-H), 3.60 (br, 2H, cyclohexyl-CH), 3.30-2.90 (br, 32H, NCH$_2$), 2.66 (s, 6H, CH$_3$), 2.10-1.80 (br, 4H, cyclohexyl-CH$_2$), 1.70-1.15 (br m, 74H), 1.0-0.80 (br, 36H, CH$_3$) ppm. $^1$H NMR (CD$_2$Cl$_2$): δ 7.65 (br, 2H, CH=N) 7.34 (br, 2H, m-H), 7.16 (br, 2H, m-H), 3.40-2.00 (br, 32H, NCH$_2$), 2.93 (br s, 6H, CH$_3$), 2.10-1.80 (br m, 4H, cyclohexyl-CH$_2$), 1.70-1.15 (br m, 74H), 1.1-0.80 (br, 36H, CH$_3$) ppm.

Two sets of signals appeared at a ratio of 6:4 in the $^1$H NMR in DMSO-d$_6$. The major signal set showed that two phenoxy ligands of a Salen-unit were different. The minor signal set showed that two phenoxy ligands were the same. It may be understood that the compound C was in an equilibrium state described below in a DMSO solvent. It had been demonstrated that the compound C had a non-imine nitrogen coordinated structure in a polar solvent such as dimethyl sulfoxide (DMSO) when there was a small substituent having a small three-dimensional obstacle such as methyl at an ortho-position of two phenoxy ligands of the Salen-unit. (*Inorg. Chem.* 2009, 48, 10455-10465). A set of generally broad signal appeared in non-polar solvents such as methylene chloride. When it was considered that an NO$_3^-$ anion was not well coordinated, it was estimated that a coordinated or non-coordinated structure may be obtained while imine nitrogen was coordinated and a nitrate anion was exchanged with an acetate anion at two axial coordinated surfaces.

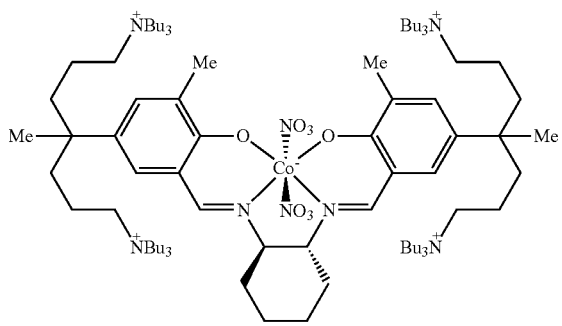

Estimated Structure of Compound in CH$_2$Cl$_2$

Example 1

Copolymerization of Carbon Dioxide/Propylene Oxide in the Presence of Poly(Ethylene Glycol) and Separation of Catalyst Copolymerization Reaction The compound C prepared in the Preparation Example 1 (3.0 mg, monomer/catalyst=100,000) and propylene oxide (10.0 g, 172 mmol) was processed and introduced into a 50 mL bomb reactor and the reactor was assembled after introducing poly(ethylene glycol) (In Chemical Formula 4, R$^{70}$ represents hydrogen, L represents —CH$_2$CH$_2$—, and Mn represents 8500-11500, 200 mg, [OH]/[Co]=22). After applying carbon dioxide gas pressure of 15 bar, the reactor was steeped into an oil bath with a previously controlled temperature of 73° C. and agitation was initiated. 35 minutes later, the internal temperature of the reactor reached at 70° C., and the pressure of the reactor started to be decrease. The polymerization reaction was carried out for 1 hour since the internal temperature of the reactor arrived at 70° C. and the

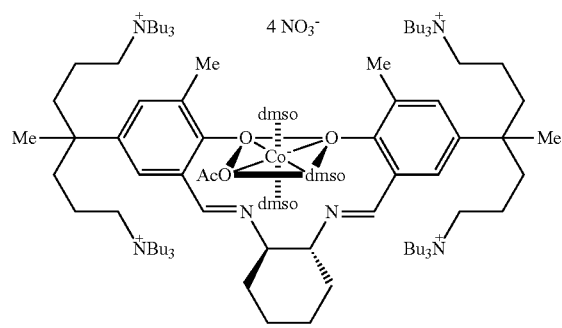

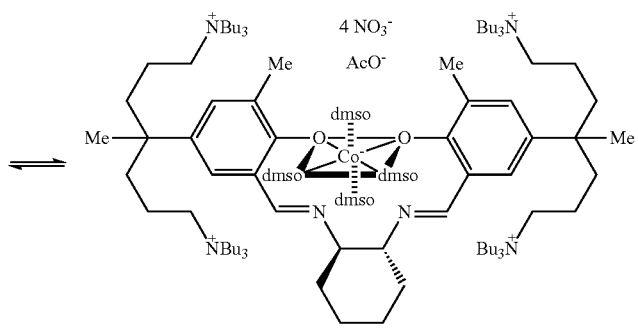

Estimated Structure of Compound C in DMSO

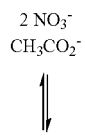

reaction was initiated. After cooling the reactor in a cold bath, the reaction was terminated by removing the carbon dioxide gas. A viscous solution with a pale yellow color was obtained.

Separation of Catalyst

After lowering viscosity of the solution by further addition of propylene oxide (10 g) to the prepared viscous solution. Filtration process was carried out through silica gel column (400 mg, Merck, 0.040-0.063 mm particle diameter (230-400 mesh) pad to obtain a colorless solution. The monomers were removed by applying vacuum. In some cases, propylene carbonate byproducts of about 1-10% were produced. A sample contain propylene carbonate as the byproduct was stored in vacuum oven of 150° C. for overnight and the propylene carbonate was removed. The pure polymer of 1.65 g was obtained and it corresponded to the TON of 7,600. A molecular weight (Mn) measured by Gel Permeation Chromatography (GPC) using a polystyrene standard was 68,300 and a molecular weight distribution (Mw/Mn) was 1.48. In the GPC curve, a polymer chain grown from nitrate or acetate contained in the catalyst appeared around a value of 47,000 and a chain grown from the introduced polymer chain was comparatively widely distributed and appeared at 105,000. A glass transition temperature (Tg) measured in differential scanning calorimetry (DSC) was 26° C. In $^1$H NMR spectrum, a poly(propylene carbonate) signal appeared at 5.01, 4.32 to 4.10, and 1.36 ppm, and the introduced poly(ethylene glycol) signal appeared at 3.66 ppm.

Block copolymers (2.44 g, TOF, 12200 h$^{-1}$) were obtained by introducing polymer of 200 mg ([OH]/[Co]=108) where Mn was 1950-2050 instead and carrying out polymerization according to the same method. Mn of the obtained polymer was 19,900 and a molecular weight distribution (Mw/Mn) was 1.30. In DSC, a glass transition signal appeared at 27° C.

Block copolymers (3.01 g, TOF, 15100 h$^-$) were obtained by introducing polymer of 250 mg ([OH]/[Co]=8) where Mn was 35,000 instead and carrying out polymerization according to the same method. Mn of the obtained polymer was 111,000 and a molecular weight distribution (Mw/Mn) was 1.57. In DSC, a glass transition signal appeared at 39° C. and a melting signal further appeared at 53° C.

Block copolymers (2.17 g, TOF, 9100 h$^{-1}$) were obtained by introducing polymer of 500 mg ([OH]/[Co]=16) where Mn was 35,000 instead and carrying out polymerization according to the same method. Mn of the obtained polymer was 54,900 and a molecular weight distribution (Mw/Mn) was 1.19. In DSC, a glass transition signal appeared at 27° C. and a melting signal further appeared at 55° C.

Example 2

Copolymerization of Carbon Dioxide/Propylene Oxide in the Presence of Poly(Propylene Glycol) and Separation of Catalyst Polymerization was carried out according to the same method as Example 1 by introducing poly(propylene glycol) (In Chemical Formula 4, $R^{70}$ represents hydrogen, L represents —CH$_2$CH(CH$_3$)—, Mn is 3500, 350 mg, [OH]/[Co]=112) instead of poly(ethylene glycol) and the catalyst was removed by the same method. Pure polymer (2.82 g) was obtained and it corresponded to a TON of 13600. A molecular weight (Mn) measured by GPC using the polystyrene standard was 22,800 and a molecular weight distribution (Mw/Mn) was 1.27. A glass transition temperature (Tg) measured by DSC was 36° C. In $^1$H NMR spectrum, polypropylene glycol) signal appeared at 3.55, 3.42, and 1.56 ppm.

Example 3

Copolymerization of Carbon Dioxide/Propylene Oxide Using Poly(Tetrahydrofuran) and Separation of Catalyst Polymerization was carried out according to the same method as Example 1 by introducing poly(tetrahydrofuran) (In Chemical Formula 4, $R^{70}$ represents hydrogen, L represents —CH$_2$CH$_2$CH$_2$CH$_2$—, Mn represents 2900, 260 mg, and [OH]/[Co]=100) instead of poly(ethylene glycol) and the catalyst was removed by the same method. Pure polymer (3.13 g) was obtained with a TON of 15700. A molecular weight (Mn) measured by GPC using the polystyrene standard was 33,800 and a molecular weight distribution (Mw/Mn) was 1.13. In the GPC curve, the chain grown from the introduced polymer chain largely appeared at 28100. A glass transition temperature (Tg) measured by DSC was 37° C. In $^1$H NMR spectrum, an introduced poly(tetrahydrofuran) signal appeared at 3.42, and 1.64 ppm.

Example 4

Copolymerization of Carbon Dioxide/Propylene Oxide used in the Presence of Poly(Di(Ethylene Glycol)Adipate)) and Separation of Catalyst Polymerization was carried out according to the same method as Example 1 by introducing poly(di(ethylene glycol) adipate) (In Chemical Formulas 5-7, E represents —CH$_2$CH$_2$CH$_2$CH$_2$—, F represents —CH$_2$CH$_2$OCH$_2$CH$_2$—, Mn is 2500, 200 mg, and [OH]/[Co]=90) instead of poly(ethylene glycol) and a catalyst was removed by the same method. Pure polymer (2.18 g) was obtained with a TON of 11900. A molecular weight (Mn) measured by GPC using the polystyrene standard was 45200 and a molecular weight distribution (Mw/Mn) was 1.09. A glass transition temperature (Tg) measured by DSC was 35° C. In $^1$H NMR spectrum, an introduced poly(di(ethylene glycol) adipate) signal appeared at 3.71, 2.38, and 1.68 ppm.

Example 5

Copolymerization of Carbon Dioxide/Propylene Oxide Used in the Presence of Poly(3-Hydroxybutyric Acid) and Separation of Catalyst Polymerization was carried out according to the same method as Example 1 by introducing poly(3-hydroxybutyric acid) (In Chemical Formula 8, G represents —CH(CH$_3$)CH$_2$—, f represents 1, $R^{90}$ represents hydrogen, 200 mg) instead of poly(ethylene glycol) and a catalyst was removed by the same method. Pure polymer (1.27 g) was obtained with a TON of 6900. A molecular weight (Mn) measured by GPC using the polystyrene standard was 107100 and a molecular weight distribution (Mw/Mn) was 1.32. In the GPC curve, a polymer chain grown from nitrate or acetate contained in the catalyst appeared around 84600 and the chain grown from the introduced polymer chain appeared at 199500. A glass transition temperature (Tg) measured by DSC was 25° C. In $^1$H NMR spectrum, a methyl signal of the introduced poly(3-hydroxybutyric acid) adipate) signal appeared at 1.30 ppm and the other signals did not appear since they were too broad to be observed.

Example 6

Copolymerization of Carbon Dioxide/Propylene Oxide in the Presence of Poly(Caprolactone Diol) and Separation of Catalyst Polymerization was carried out according to the same method as Example 1 by introducing poly(caprolactone diol) (In Chemical Formula 8, G represents —CH$_2$CH$_2$CH$_2$CH$_2$CH$_2$—, f represents 2, Aldrich Company, Mn is 2000, 250 mg, [OH]/[Co]=139) instead of poly (ethylene glycol) and the catalyst was removed by the same method. Pure polymer of 3.29 g was obtained with a TON of 15900. A molecular weight (Mn) measured by GPC using the polystyrene standard was 32000 and a molecular weight distribution (Mw/Mn) was 1.07. A glass transition temperature (Tg) measured by DSC was 33° C. In $^1$H NMR spectrum, an introduced poly(caprolactone diol) signal appeared at 4.07, 2.33 and 1.68 ppm.

Example 7

Copolymerization of Carbon Dioxide/Propylene Oxide in the Presence of Poly(Caprolactone Triol) (Poly(Caprolactone Triol)) and Separation of Catalyst Polymerization was carried out according to the same method as Example 1 by introducing poly(caprolactone triol) (In Chemical Formula 8, G represents —$CH_2CH_2CH_2CH_2CH_2$—, f represents 3, $R^{90}$ represents $CH_3CH_2C\{CH_2—\}_3$, Mn is 900, 200 mg, [OH]/[Co]=374) instead of poly(ethylene glycol) and a catalyst was removed by the same method. Pure polymer of 1.21 g was obtained with a TON of 6600. A molecular weight (Mn) measured by GPC using the polystyrene standard was 8300 and a molecular weight distribution (Mw/Mn) was 1.04. A glass transition temperature (Tg) measured by DSC was 20° C. In $^1$H NMR spectrum, an introduced poly(caprolactone triol) signal appeared at 3.99, 2.33, 1.67, and 1.23 ppm.

Example 8

Copolymerization of Carbon Dioxide/Propylene Oxide in the Presence of Poly(Hexamethylene Carbonate)Diol and Separation of Catalyst Polymerization was carried out according to the same method as Example 1 by introducing poly(hexamethylene carbonate)diol (In Chemical Formula 9, Q represents —$CH_2CH_2CH_2CH_2CH_2CH_2$—, Mn is 2000, 200 mg, [OH]/[Co]=112) instead of poly(ethylene glycol) and a catalyst was removed by the same method. Pure polymer of 2.18 g was obtained with a TON of 11900. A molecular weight (Mn) measured by GPC using the polystyrene standard was 24000 and a molecular weight distribution (Mw/Mn) was 1.07. A glass transition temperature (Tg) measured by DSC was 31° C. In $^1$H NMR spectrum, an introduced poly(hexamethylene carbonate)diol signal appeared at 3.67, 1.70, and 1.43 ppm.

Example 9

Copolymerization of Carbon Dioxide/Propylene Oxide in the Presence of Poly(Dimethylsiloxane) and Separation of Catalyst Polymerization was carried out according to the same method as Example 1 by introducing poly(dimethylsiloxane) (In Chemical Formula 10, $R^{111}$ and $R^{112}$ represent methyl, $R^{113}$ represents hydrogen, Viscosity 1,800-2,200 cSt, 200 mg) instead of poly(ethylene glycol) and a catalyst was removed by the same method. Pure polymer of 1.90 g was obtained with a TON of 10000. A molecular weight (Mn) measured by GPC using the polystyrene standard was 148000 and the molecular weight distribution (Mw/Mn) was 1.39. A glass transition temperature (Tg) measured by DSC was 42° C. In $^1$H NMR spectrum, an introduced poly(dimethylsiloxane) signal appeared at 0.09 ppm.

Example 10

Copolymerization of Carbon Dioxide/Propylene Oxide in the Presence of Polyethylene Mono Alcohol and Separation of Catalyst Polymerization was carried out according to the same method as Example 1 by introducing polyethylene mono alcohol (In Chemical Formula 11, J represents —O—, T represents —$CH_2CH_2$—, woo represents hydrogen, Mn is 700, 100 mg, [OH]/[Co]=80) instead of poly(ethylene glycol) and a catalyst was removed by the same method. Pure polymer of 1.80 g was obtained with a TON of 9900. A molecular weight (Mn) measured by GPC using the polystyrene standard was 18800 and a molecular weight distribution (Mw/Mn) was 1.18. In the DSC curve, poly(propylene carbonate) showed at a glass transition temperature (Tg) of 37.2° C. and a melting (Tm) signal of PE appeared at 92° C. In $^1$H NMR spectrum, an introduced polyethylene signal appeared at 1.27 ppm.

A block copolymer (TOF, 13500 h$^{-1}$) of 2.94 g was obtained by introducing the same polyethylene alcohol of 500 mg ([OH]/[Co]=397) instead and carrying out polymerization according to the same method. Mn of the obtained polymer was 7800 and a molecular weight distribution (Mw/Mn) was 1.18. In the DSC, a glass transition temperature (Tg) appeared at 34° C. and a melting temperature (Tm) appeared at 96° C.

A block copolymer (TOF, 8600 h$^{-1}$) of 2.56 g was obtained by introducing the same polyethylene alcohol of 1.00 g ([OH]/[Co]=794) instead and carrying out polymerization according to the same method. Mn of the obtained polymer was 3500 and a molecular weight distribution (Mw/Mn) was 1.45. In the DSC, a glass transition temperature (Tg) appeared at 26° C. and a melting temperature (Tm) appeared at 103° C.

Example 11

Copolymerization of Carbon Dioxide/Propylene Oxide in the Presence of Poly(Ethylene-Co-Acrylic Acid) and Separation of Catalyst Polymerization was carried out according to the same method as Example 1 by introducing poly(ethylene-co-acrylic acid) (In Chemical Formula 12, T represents —$CH_2CH_2$—, $R^{121}$ represents hydrogen, J represents —$CO_2$—, Brookfield viscosity 575 cps (145° C.), 100 mg, 5 wt % acrylic acid, [COOH]/[Co]=39) instead of poly(ethylene glycol) and a catalyst was removed by the same method. Pure polymer of 2.23 g was obtained with a TON of 12200. A molecular weight (Mn) measured by GPC using the polystyrene standard was 64500 and a molecular weight distribution (Mw/Mn) was 2.01. In the GPC curve, a polymer chain grown from nitrate or acetate contained in the catalyst showed a small peak around 30000 and a chain grown from water showed a small peak around 63000. A chain grown from the introduced polymer chain showed comparatively broad distribution and showed a large peak at 106900. In the DSC curve, a glass transition temperature (Tg) of poly(propylene carbonate) appeared at 38.9° C. and a melting (Tm) signal of PE appeared at 65° C. and 95° C. In $^1$H NMR spectrum, an introduced poly(ethylene-co-acrylic acid) signal appeared at 1.27 ppm.

A block copolymer (TOF, 10700 h$^{-1}$) of 2.00 g was obtained by introducing the same poly(ethylene-co-acrylic acid) of 200 mg ([OH]/[Co]=78) and carrying out polymerization according to the same method. Mn of the obtained polymer was 37900 and a molecular weight distribution (Mw/Mn) was 1.79. In the DSC, a glass transition temperature (Tg) appeared at 37° C. and a melting temperature (Tm) further appeared at 98° C.

A block copolymer (TOF, 13800 h$^{-1}$) of 2.86 g was obtained by introducing the same poly(ethylene-co-acrylic acid) of 400 mg ([OH]/[Co]=154) and carrying out polymerization according to the same method. Mn of the obtained polymer was 34000 and a molecular weight distribution (Mw/Mn) was 1.54. In the DSC, a glass transition temperature (Tg) appeared at 36° C. and a melting temperature (Tm) further appeared at 102° C.

A block copolymer (TOF, 11500 h$^{-1}$) of 2.73 g was obtained by introducing the same poly(ethylene-co-acrylic acid) of 600 mg ([OH]/[Co]=231) and carrying out polymerization according to the same method. Mn of the obtained polymer was 22500 and a molecular weight distribution (Mw/Mn) was 1.58. In the DSC, a glass transition temperature (Tg) appeared at 33° C. and a melting temperature (Tm) further appeared at 102° C.

Example 12

Copolymerization of Carbon Dioxide/Propylene Oxide in the Presence of Poly(Methyl Methacrylate-Co-Methacrylic Acid) and Separation of Catalyst Polymerization was carried out according to the same method as Example 1 by introducing poly(methyl methacrylate-co-methacrylic acid) (In Chemical Formula 12, T represents —CH$_2$C(Me)(CO$_2$Me)—, R$^{121}$ represents methyl, J represents —CO$_2$—, x:y=1:0.016, Mn is 15,000, 200 mg, [COOH]/[Co]=18) instead of polyethylene glycol) and the catalyst was removed by the same method. Pure polymer of 2.06 g was obtained and with a TON of 11200. A molecular weight (Mn) measured by GPC using the polystyrene standard was 118500 and a molecular weight distribution (Mw/Mn) was 2.23. In the GPC curve, a polymer chain grown from nitrate or acetate contained in the catalyst appeared around 55400 and a chain grown from water appeared around 115400. A chain grown from the introduced polymer chain showed comparatively broad distribution and showed a large peak at 483500. A glass transition temperature (Tg) measured by DSC was 37° C. In $^1$H NMR spectrum, an introduced poly(methyl methacrylate-co-methacrylic acid) signal appeared at 3.62, 1.04, and 0.86 ppm.

A block copolymer (TOF, 8500 h$^{-1}$) of 1.94 g was obtained by introducing the same poly(methyl methacrylate-co-methacrylic acid) of 400 mg ([OH]/[Co]=36) and carrying out polymerization according to the same method. Mn of the obtained polymer was 71000 and a molecular weight distribution (Mw/Mn) was 1.93. In the DSC, a glass transition temperature (Tg) appeared at 34° C.

Example 13

Copolymerization of Carbon Dioxide/Propylene Oxide in the Presence of Polystyrene Carboxylic Acid and Separation of Catalyst Polymerization was carried out according to the same method as Example 1 by introducing polystyrene carboxylic acid (In Chemical Formula 11, J represents —C(O)O—, T represents —CH$_2$CH(Ph)—, R$^{100}$ represents butyl, Mn is 44000, 250 mg, and [OH]/[Co]=3) instead of poly(ethylene glycol) and a catalyst was removed by the same method. Pure polymer of 2.34 g was obtained with a TON of 11500. A molecular weight (Mn) measured by GPC using the polystyrene standard was 123000 and a molecular weight distribution (Mw/Mn) was 1.43. In the DSC curve, poly(propylene carbonate) appeared a glass transition temperature (Tg) of 41° C. and polystyrene showed a glass transition temperature (Tg) of 107° C. In $^1$H NMR spectrum, the introduced polystyrene signal appeared broadly in the rage of 7.20 to 6.40.

Figure 2:
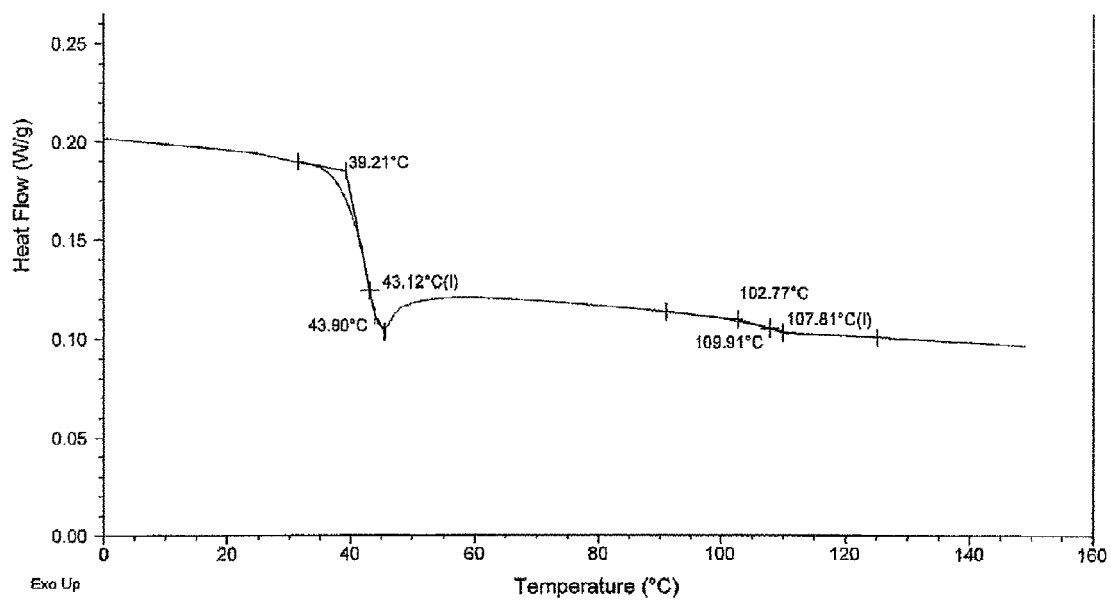
FIG. 2 is a graph showing differential scanning calorimetry (DSC) data of polystyrene-poly(propylene carbonate) block copolymers in accordance with Example 13.

A block copolymer (TOF, 9700 h$^{-1}$) of 2.50 g was obtained by introducing the same polystyrene carboxylic acid of 500 mg ([OH]/[Co]=6) and carrying out polymerization according to the same method. Mn of the obtained polymer was 113500 and a molecular weight distribution (Mw/Mn) was 1.50 (see FIG. 1). In the DSC, a glass transition temperature (Tg) appeared at 43° C. and another glass transition temperature (Tg) appeared at 108° C. (see FIG. 2).

What is claimed is:

1. A method for preparing block or graft copolymers of poly(alkylene carbonate) and a polymer compound, comprising:

carrying out alternating copolymerization of carbon dioxide and one or more epoxide compounds selected from the group consisting of (C2-C20)alkyleneoxide with or without halogen, (C1-C20)alkyloxy, (C6-C20)aryloxy or (C6-C20)ar(C1-C20)alkyloxy substituent(s); (C4-C20)cycloalkyleneoxide with or without halogen, (C1-C20)alkyloxy, (C6-C20)aryloxy or (C6-C20)ar(C1-C20)alkyloxy substituent(s); and (C8-C20)styreneoxide with or without halogen, (C1-C20)alkyloxy, (C6-C20)aryloxy, (C6-C20)ar(C1-C20)alkyloxy or (C1-C20)alkyl substituent(s), in the presence of the polymer compound containing a hydroxyl or carboxyl acid group at an end thereof or branched chain, selected from the following Chemical Formulas 5 to 7 and 9 to, by using a complex of Chemical Formula 1 as a catalyst:

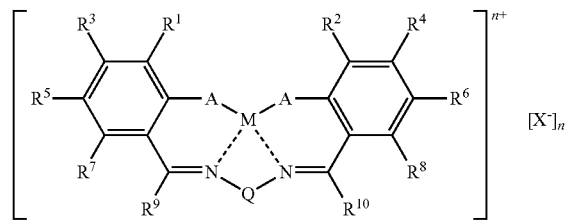

[Chemical Formula 1]

wherein

M represents trivalent cobalt or trivalent chromium;

A represents an oxygen or sulfur atom;

Q represents a diradical for linking two nitrogen atoms;

R$^1$ to R$^{10}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-

C20)alkylcarbonyl; (C6-C20)arylcarbonyl; or a hydrocarbyl-substituted metalloid radical of a Group 14 metal;

two of the $R^1$ to $R^{10}$ may be linked to each other to form a ring;

at least one of the hydrogen included in the $R^1$ to $R^{10}$ and Q is a protonated group selected from the group consisting of Chemical Formula a, Chemical Formula b and Chemical Formula c;

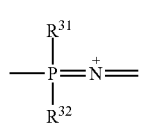
[Chemical Formula a]

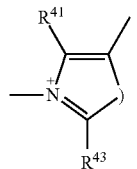
[Chemical Formula b]

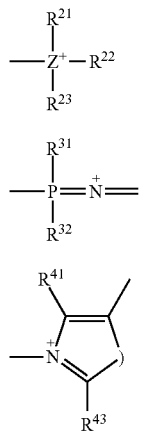
[Chemical Formula c]

$X^-$ independently represent a halogen anion; $HCO_3^-$; $BF_4^-$; $ClO_4^-$; $NO_3^-$; $PF_6^-$; (C6-C20)aryloxy anion; (C6-C20)aryloxy anion with at least one of halogen, nitrogen, oxygen, silicon, sulfur and phosphorus atoms; (C1-C20)alkylcarboxy anion; (C1-C20)alkylcarboxy anion with at least one of halogen, nitrogen, oxygen, silicon, sulfur and phosphorus atoms; (C6-C20)arylcarboxy anion; (C6-C20)arylcarboxy anion with at least one of halogen, nitrogen, oxygen, silicon, sulfur and phosphorus atoms; (C1-C20)alkoxy anion; (C1-C20)alkoxy anion with at least one of halogen, nitrogen, oxygen, silicon, sulfur and phosphorus atoms; (C1-C20)alkylcarbonate anion; (C1-C20)alkylcarbonate anion with at least one of halogen, nitrogen, oxygen, silicon, sulfur and phosphorus atoms; (C6-C20)arylcarbonate anion; (C6-C20)arylcarbonate anion with at least one of halogen, nitrogen, oxygen, silicon, sulfur and phosphorus atoms; (C1-C20)alkylsulfonate anion; (C1-C20)alkylsulfonate anion with at least one of halogen, nitrogen, oxygen, silicon, sulfur and phosphorus atoms; (C1-C20)alkylamido anion; (C1-C20)alkylamido anion with at least one of halogen, nitrogen, oxygen, silicon, sulfur and phosphorus atoms; (C6-C20)arylamido anion; (C6-C20)arylamido anion with at least one of halogen, nitrogen, oxygen, silicon, sulfur and phosphorus atoms; (C1-C20)alkylcarbamate anion; (C1-C20)alkylcarbamate anion with at least one of halogen, nitrogen, oxygen, silicon, sulfur and phosphorus atoms; (C6-C20)arylcarbamate anion; or (C6-C20)arylcarbamate anion with at least one of halogen, nitrogen, oxygen, silicon, sulfur and phosphorus atoms;

Z represents a nitrogen or phosphorus atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{21}$, $R^{22}$ and $R^{23}$ or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; or a hydrocarbyl-substituted metalloid radical of a Group 14 metal; two of $R^{41}$, $R^{42}$ and $R^{43}$ may be linked to each other to form a ring;

X' represents an oxygen atom, a sulfur atom or N—R wherein R represents (C1-C20)alkyl;

n represents an integer of adding 1 to the total number of protonated groups contained in $R^1$ to $R^{10}$ and Q;

$X^-$ is coordinated or de-coordinated with M; and the imine nitrogen atom(s) is/are coordinated or de-coordinated with M $HO_2C$—[E—$CO_2$—F—$O_2C$]$_m$-E-$CO_2H$    [Chemical Formula 5]

HO—[F—$O_2$C-E-$CO_2$]$_m$—F—OH    [Chemical Formula 6]

$HO_2C$-[E-$CO_2$—F—$O_2C$]$_m$-E-$CO_2$—F—OH    [Chemical Formula 7]

wherein

E represents (C1-C30) hydrocarbyl diradical, and m Es contained in one chain are the same or different from each other wherein m is equal to the number of Es in one chain; F represents (C2-C30)hydrocarbyl diradical with or without an ether, ester, or amino group and m Fs contained in one chain are the same or different from each other wherein m is equal to the number of Fs in one chain; a number average molecular weight (Mn) of the polymer compound of Chemical Formulas 5 to 7 is 500 to 500,000

HO—[Q—OC(O)O]$_m$-Q-OH    [Chemical Formula 9]

wherein

Q independently represents (C1-C30)hydrocarbyl diradical and m Qs contained in one chain are the same or different from each other wherein m is equal to the number of Qs in one chain;

a number average molecular weight (Mn) of the polymer compound of Chemical Formula 9 is 500 to 500,000

HO—[($R^{111}$)($R^{112}$)Si—O]$_m R^{113}$    [Chemical Formula 10]:

wherein $R^{111}$ and $R^{112}$ independently represent (C1-C15)hydrocarbyl radical; $R^{113}$ represents hydrogen or (C1-C30)hydrocarbyl;

a number average molecular weight (Mn) of the polymer compound of Chemical Formula 10 is 500 to 500,000

$R^{100}$-[T]$_m$-JH    [Chemical Formula 11]

-{[T]$_x$-[$CH_9CR^{121}$(JH)]$_y$}$_m$-    [Chemical Formula 12]

wherein

T represents —CH$_2$CH$_2$—, —CH$_2$CH(CH$_3$)—, —CH$_2$CH(CH$_2$CH$_3$)—, —CH$_2$CH(CH$_2$CH$_2$CH$_3$)—, —CH$_2$CH(CH$_2$CH$_2$CH$_2$CH$_2$CH$_3$)—, —CH$_2$CH(C$_6$H$_5$)—, —CH$_2$CH(CO$_2$Me)-, —CH$_2$CH(Cl)—, —CH$_2$C(Me)(CO$_2$Me)-, —CH$_2$CH(OC(O)CH$_3$)—, —CH$_2$CH=CHCH$_2$—, —CH(Me)CH=CHCH$_2$— or —CH(Cl)CH=CHCH$_2$— and Ts contained in one chain may be the same or different from each other; R$^{100}$ represents HJ-, hydrogen, (C1-C20)hydrocarbyl, (C1-C20)alkoxy, (C1-C20)alkylcarbonyloxy or (C6-C20)arylcarbonyloxy; R$^{121}$ represents hydrogen or methyl; J represents —O— or —CO$_2$—; a number average molecular weight (Mn) of the polymer compound of Chemical Formulas 11 and 12 is 500 to 500,000.

2. The method of claim 1, wherein the M represents a trivalent cobalt;

A represents oxygen;

Q represents trans-1,2-cyclohexylene, phenylene or ethylene;

R$^1$ and R$^2$ are the same to or different from primary (C1-C20)alkyl;

R$^3$ through R$^{10}$ independently represent hydrogen or —[YR$^{51}_{3-a}${(CR$^{52}$R$^{53}$)$_b$N$^+$R$^{54}$R$^{55}$R$^{56}$}$_a$];

Y represents C or Si;

R$^{51}$, R$^{52}$, R$^{53}$, R$^{54}$, R$^{55}$ and R$^{56}$ independently represent hydrogen; halogen; (C1-C20)alkyl; (C1-C20)alkyl with at least one of halogen, nitrogen, oxygen, silicon, sulfur and phosphorus; (C2-C20)alkenyl; (C2-C20)alkenyl with at least one of halogen, nitrogen, oxygen, silicon, sulfur and phosphorus; (C1-C20)alkyl(C6-C20)aryl; (C1-C20)alkyl(C6-C20)aryl with at least one of halogen, nitrogen, oxygen, silicon, sulfur and phosphorus; (C6-C20)aryl(C1-C20)alkyl; (C6-C20)aryl(C1-C20)alkyl with at least one of halogen, nitrogen, oxygen, silicon, sulfur and phosphorus; (C1-C20)alkoxy; (C6-C30)aryloxy; formyl; (C1-C20)alkylcarbonyl; (C6-C20)arylcarbonyl; or a hydrocarbyl-substituted metalloid radical of a Group 14 metal, two of R$^{54}$, R$^{55}$ and R$^{56}$ may be linked to each other to form a ring;

a represents an integer of 1 to 3, and b represents an integer of 1 to 20;

n represents an integer of 4 or more as a value of adding 1 to a total number of quaternary ammonium salts contained in R$^3$ through R$^{10}$; provided that when a represents 1, at least three of R$^3$ through R$^{10}$ represents —[YR$^{51}_{3-a}${(CR$^{52}$R$^{53}$)$_b$N$^+$R$^{54}$R$^{55}$R$^{56}$}$_a$], when a represents 2, at least two of R$^3$ through R$^{10}$ represents —[YR$^{51}_{3-a}${(CR$^{52}$R$^{53}$)$_b$N$^+$R$^{54}$R$^{55}$R$^{56}$}$_a$], and when a represents 3, at least one of R$^3$ through R$^{10}$ represents —[YR$^{51}_{3-a}${(CR$^{52}$R$^{53}$)$_b$N$^+$R$^{54}$R$^{55}$R$^{56}$}$_a$].

3. The method of claim 2, wherein a complex of Chemical Formula 3 below is used as the catalyst:

[Chemical Formula 3]

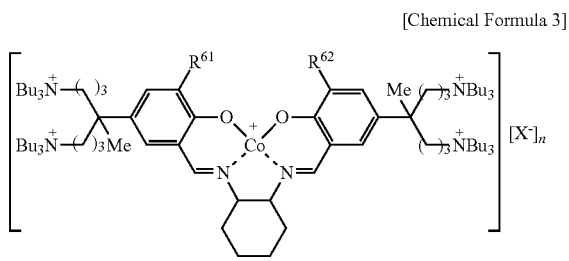

wherein

R$^{61}$ and R$^{62}$ independently represent methyl or ethyl; X$^-$ independently represents a nitrate or acetate anion; nitrogen of imine is coordinated or de-coordinated with cobalt, and each X— is coordinated or de-coordinated with cobalt.

4. The method of claim 1, wherein wherein in Chemical Formulas 5 to 7,

E represents —CH$_2$CH$_2$—, —CH$_2$CH$_2$CH$_2$—, —CH$_2$CH$_2$CH$_2$CH$_2$—, para-phenylene, or 2,6-naphthalenediyl, F represents —CH$_2$CH$_2$OCH$_2$CH$_2$—, —CH$_2$CH$_2$—, —CH$_2$CH(CH$_3$)—, —CH$_2$CH$_2$CH$_2$—, —CH$_2$C(CH$_3$)$_2$CH$_2$—, —CH$_2$CH(CH$_3$)CH$_2$— or —CH$_2$CH$_2$CH$_2$CH$_2$CH$_2$CH$_2$—, and a number average molecular weight (Mn) of the polymer compound of Chemical Formulas 5 to 7 is 500 to 500,000.

5. The method of claim 1, wherein in Chemical Formula 9,

Q represents —CH$_2$CH$_2$CH$_2$CH$_2$— or —CH$_2$CH$_2$CH$_2$CH$_2$CH$_2$CH$_2$—, and a number average molecular weight (Mn) of the polymer compound of Chemical Formula 9 is 500 to 500,000.

6. The method of claim 1, wherein in Chemical Formula 10,

R$^{111}$ and R$^{112}$ independently represent methyl or phenyl, R$^{113}$ represents hydrogen or (C1-C8)alkyl, and a number average molecular weight (Mn) of the polymer compound of Chemical Formula 10 is 500 to 500,000.

7. The method of claim 1, wherein in Chemical Formula 11,

J represents —O— or —CO$_2$—, T represents —CH$_2$CH$_2$—, —CH$_2$CH(CH$_2$CH$_3$)— or —CH$_2$CH(C$_6$H$_5$)—, R$^{100}$ represents hydrogen, HO—, HO$_2$C— or butyl, and a number average molecular weight (Mn) of the polymer compound of Chemical Formula is 500 to 500,000.

8. The method of claim 1, wherein in Chemical Formula 12,

T represents —CH$_2$CH$_2$—, —CH$_2$CH(C$_6$H$_5$)—, —CH$_2$CH(CO$_2$Me)-, —CH$_2$CH(Cl)— or —CH$_2$C(Me)(CO$_2$Me)-, R$^{121}$ represents hydrogen or methyl, J represents —CO$_2$—, and a number average molecular weight (Mn) of the polymer compound of Chemical Formulas 11 and 12 is 500 to 500,000.

9. A method for preparing poly(alkylene carbonate), comprising:

preparing block or graft copolymers of poly(alkylene carbonate) and polymer compound containing a hydroxyl or carboxyl acid group at an end thereof or branched chain according to the method of claim 1; and separating a catalyst from the prepared block or graft copolymers by forming a composite of the solid inorganic materials or polymer materials and the catalyst by contacting a solution, in which the prepared block or graft copolymers and the catalyst are dissolved, to solid inorganic materials, polymer materials, or a mixture thereof that are not dissolved in the solution.

10. The method of claim 9, wherein the solid inorganic material is surface-modified or non-modified silica or alumina, and the solid polymer material has a functional group reactive to deprotonation by alkoxy anion.

11. The method of claim 10, wherein the functional group reactive to deprotonation by alkoxy anion is a sulfonic acid group, carboxylic acid group, phenol group or alcohol group.

* * * * *

UNITED STATES PATENT AND TRADEMARK OFFICE
CERTIFICATE OF CORRECTION

PATENT NO. : 8,637,634 B2  
APPLICATION NO. : 13/036714  
DATED : January 28, 2014  
INVENTOR(S) : JiSu Jeong et al.

Page 1 of 1

It is certified that error appears in the above-identified patent and that said Letters Patent is hereby corrected as shown below:

In the Claims:

Column 28, Line 38, Claim 1, delete "9 to," and insert -- 9 to 12, --
Column 30, Line 67, Claim 1, delete "-$\{[T]_x$-$[CH_9CR^{121}(JH)]_y\}_m$-" and insert -- -$\{[T]_x$-$[CH_2CR^{121}(JH)]_y\}_m$- --
Column 32, Line 11, Claim 4, after "wherein" delete "wherein"
Column 32, Line 44, Claim 7, delete "Formula" and insert -- Formula 11 --

Signed and Sealed this
Tenth Day of June, 2014

Michelle K. Lee
*Deputy Director of the United States Patent and Trademark Office*